(12) United States Patent
Jung et al.

(10) Patent No.: US 12,133,493 B2
(45) Date of Patent: Nov. 5, 2024

(54) PLANT CULTIVATION APPARATUS

(71) Applicant: LG ELECTRONICS INC., Seoul (KR)

(72) Inventors: Yong Ki Jung, Seoul (KR); Tae Yang Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 242 days.

(21) Appl. No.: 17/772,039

(22) PCT Filed: Sep. 28, 2020

(86) PCT No.: PCT/KR2020/013274
§ 371 (c)(1),
(2) Date: Apr. 26, 2022

(87) PCT Pub. No.: WO2021/085871
PCT Pub. Date: May 6, 2021

(65) Prior Publication Data
US 2022/0400626 A1    Dec. 22, 2022

(30) Foreign Application Priority Data
Nov. 1, 2019  (KR) .......................... 10-2019-0138817

(51) Int. Cl.
*A01G 9/24*    (2006.01)
(52) U.S. Cl.
CPC ............. *A01G 9/249* (2019.05); *A01G 9/247* (2013.01)

(58) Field of Classification Search
CPC .......... A01G 9/249; A01G 9/247; A01G 9/00; A01G 9/20; A01G 2009/003; A01G 7/045
See application file for complete search history.

(56) References Cited

U.S. PATENT DOCUMENTS

| 2,051,461 A | * | 8/1936 | Lee ..................... A01G 31/06 47/60 |
| 4,914,858 A | * | 4/1990 | Nijssen ................. A01G 7/045 47/60 |
| 5,012,609 A | * | 5/1991 | Ignatius ................ A01G 7/045 47/1.01 R |

(Continued)

FOREIGN PATENT DOCUMENTS

| CN | 205480338 | 8/2016 |
| CN | 108419564 | 8/2018 |

(Continued)

OTHER PUBLICATIONS

European Search Report dated Sep. 7, 2023 issued in Application No. 20882579.4.

(Continued)

*Primary Examiner* — Ebony E Evans
(74) *Attorney, Agent, or Firm* — KED & ASSOCIATES, LLP

(57) ABSTRACT

A plant cultivation apparatus has a lighting module that is provided above a bed in a cabinet, and the lighting module includes a light source part including a plurality of light sources, a lighting case in which the light source part is provided, and a lighting cover coupled to the lighting case and covering the light source part. The lighting module is removably mounted to the cabinet in a removable manner.

20 Claims, 22 Drawing Sheets

(56) References Cited

U.S. PATENT DOCUMENTS

| | | | | |
|---|---|---|---|---|
| 6,474,838 | B2 * | 11/2002 | Fang | A01G 9/249 |
| | | | | 362/800 |
| 6,680,200 | B2 * | 1/2004 | Everett | A01G 31/06 |
| | | | | 435/284.1 |
| 6,725,598 | B2 * | 4/2004 | Yoneda | A01G 31/02 |
| | | | | 47/60 |
| 8,360,602 | B2 * | 1/2013 | Hsu | A01G 7/045 |
| | | | | 362/231 |
| 10,244,595 | B2 * | 3/2019 | Grajcar | H05B 45/46 |
| 10,306,841 | B2 * | 6/2019 | Fok | A01G 9/249 |
| 2017/0055538 | A1 * | 3/2017 | Ohta | H05B 45/20 |
| 2018/0036884 | A1 | 12/2018 | Frison | |
| 2019/0178451 | A1 | 6/2019 | Wells | |
| 2019/0183062 | A1 | 6/2019 | Pham et al. | |

FOREIGN PATENT DOCUMENTS

| | | | | | |
|---|---|---|---|---|---|
| CN | 108419564 | A | * | 8/2018 | ............. A01G 31/02 |
| EP | 3695707 | A1 | * | 8/2020 | ........... A01G 27/005 |
| EP | 3695710 | A1 | * | 8/2020 | ........... A01G 27/003 |
| GB | 2458808 | | | 10/2009 | |
| JP | 2019-017322 | | | 2/2019 | |
| KR | 10-2012-0007420 | | | 1/2012 | |
| KR | 10-2012-0028040 | | | 3/2012 | |
| KR | 20-0465385 | | | 2/2013 | |
| KR | 10-1240375 | | | 3/2013 | |
| KR | 20-0467246 | | | 6/2013 | |
| KR | 20130061562 | A | * | 6/2013 | ............. A01G 31/06 |
| KR | 10-13422141 | | | 12/2013 | |
| KR | 101354706 | B1 | * | 1/2014 | ............. A01G 9/246 |
| KR | 10-1400375 | | | 6/2014 | |
| KR | 10-1422636 | | | 7/2014 | |
| KR | 20160107701 | A | * | 9/2016 | ............... A01G 9/26 |
| KR | 10-2019-0088222 | | | 7/2019 | |
| WO | WO 2021/085871 | | | 5/2021 | |

OTHER PUBLICATIONS

International Search Report and Written Opinion dated Jan. 21, 2021 issued in PCT Application No. PCT/KR2020/013274.

Australian Examination Report dated Aug. 16, 2023 issued in Application No. 2020375409.

* cited by examiner

[Fig. 3]
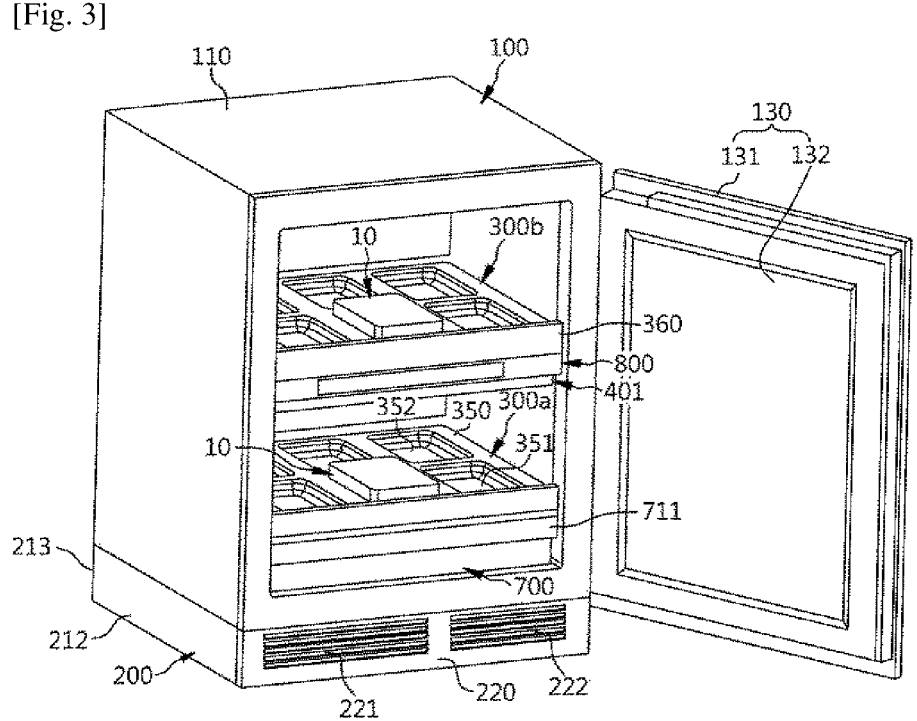

[Fig. 4]
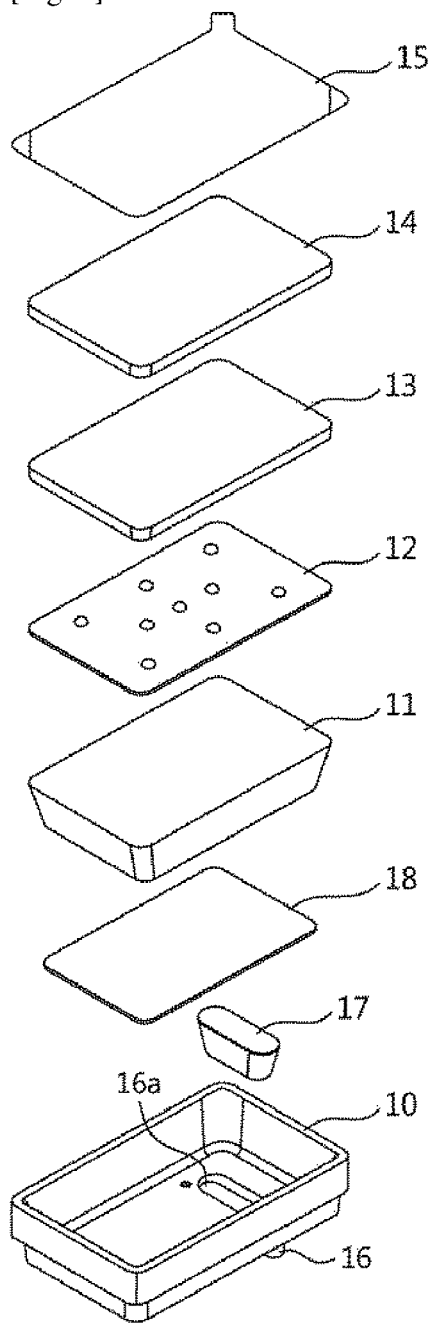
[Fig. 5]
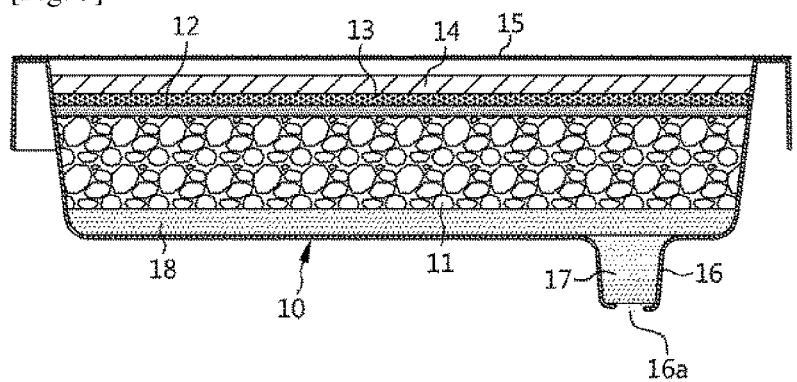

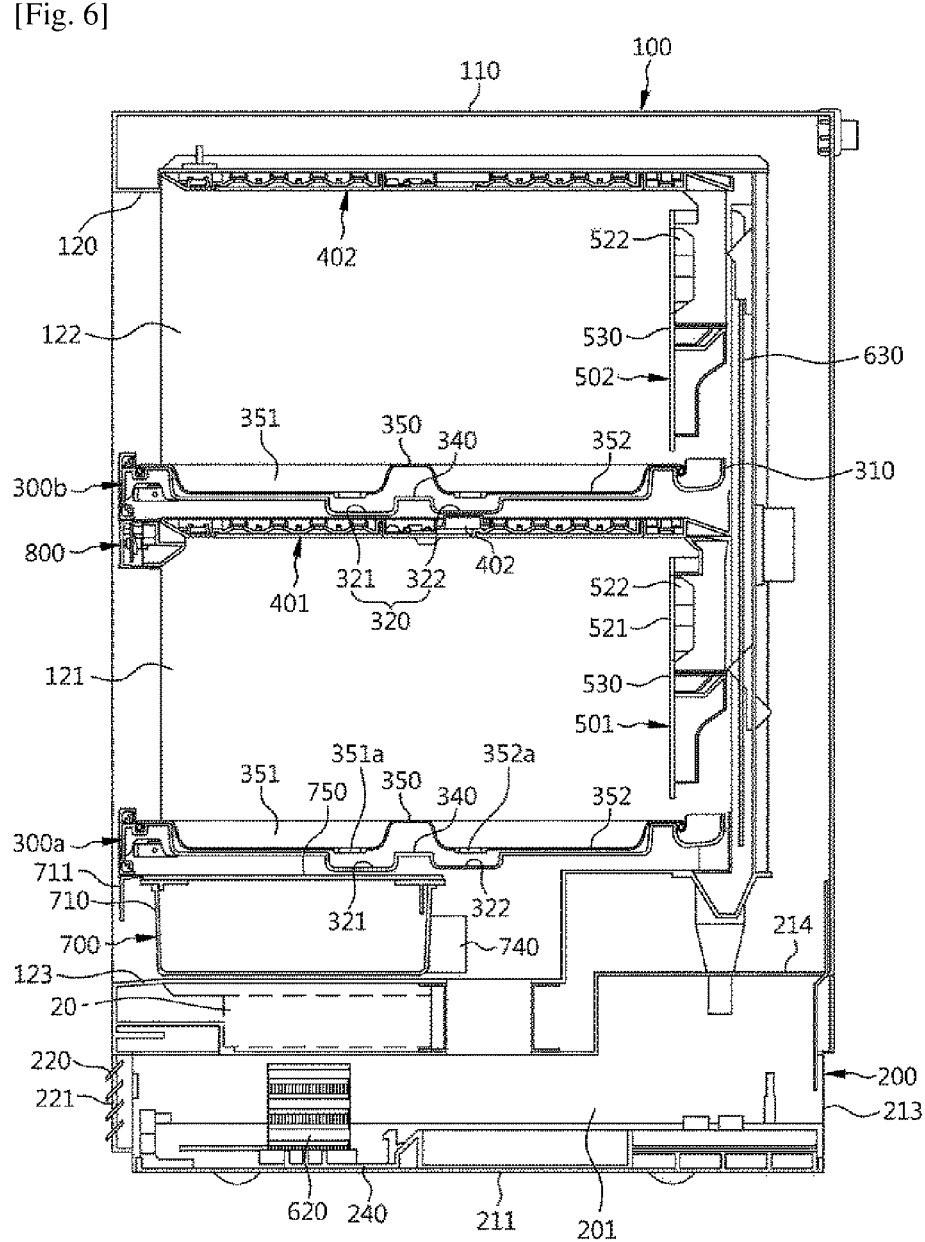
[Fig. 6]

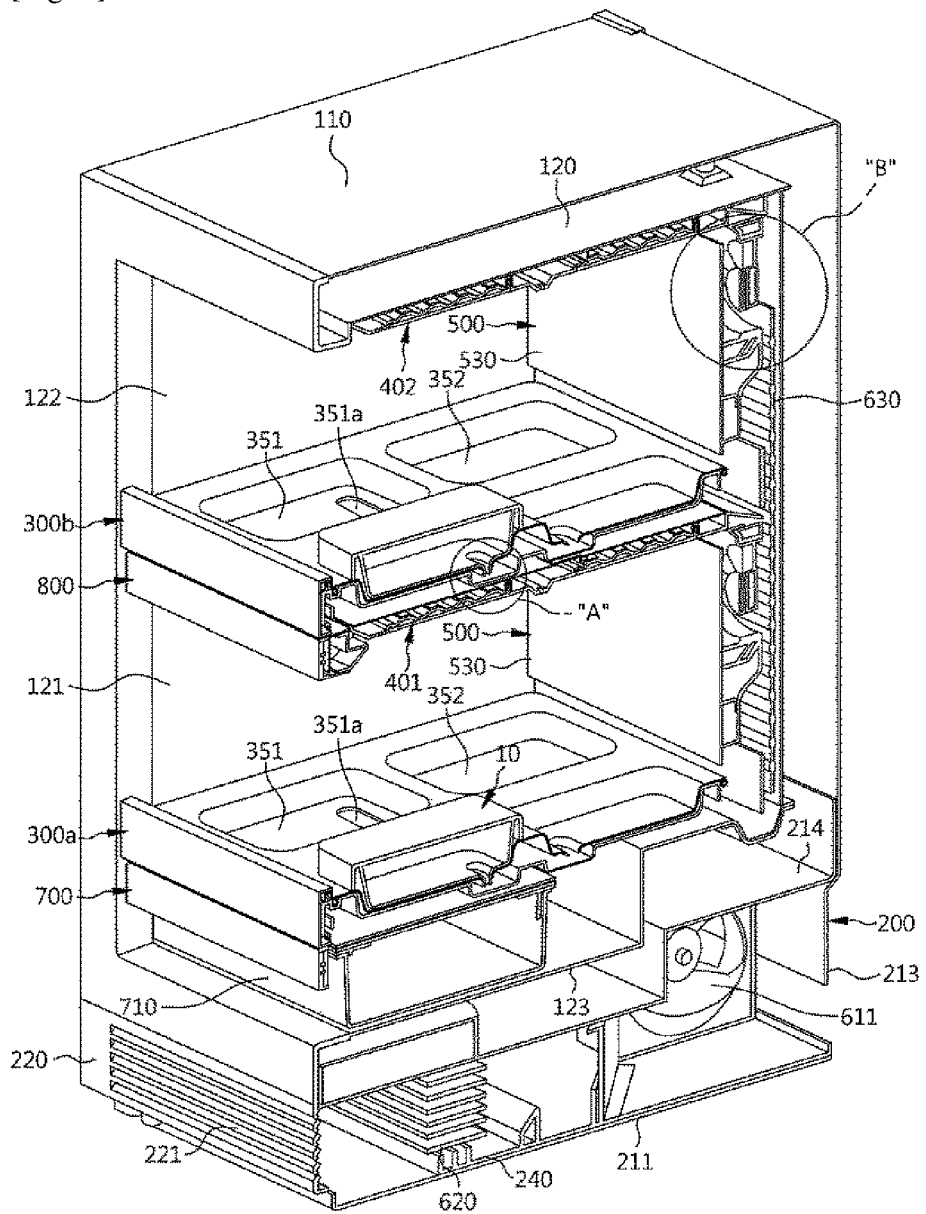
[Fig. 7]

[Fig. 8]
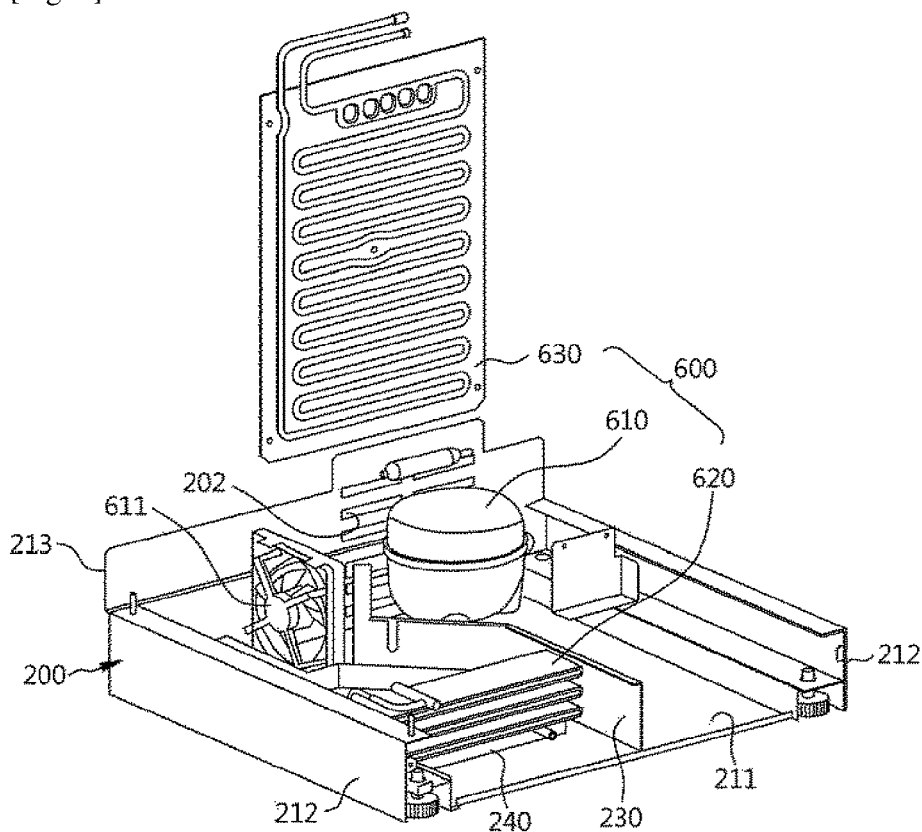
[Fig. 9]
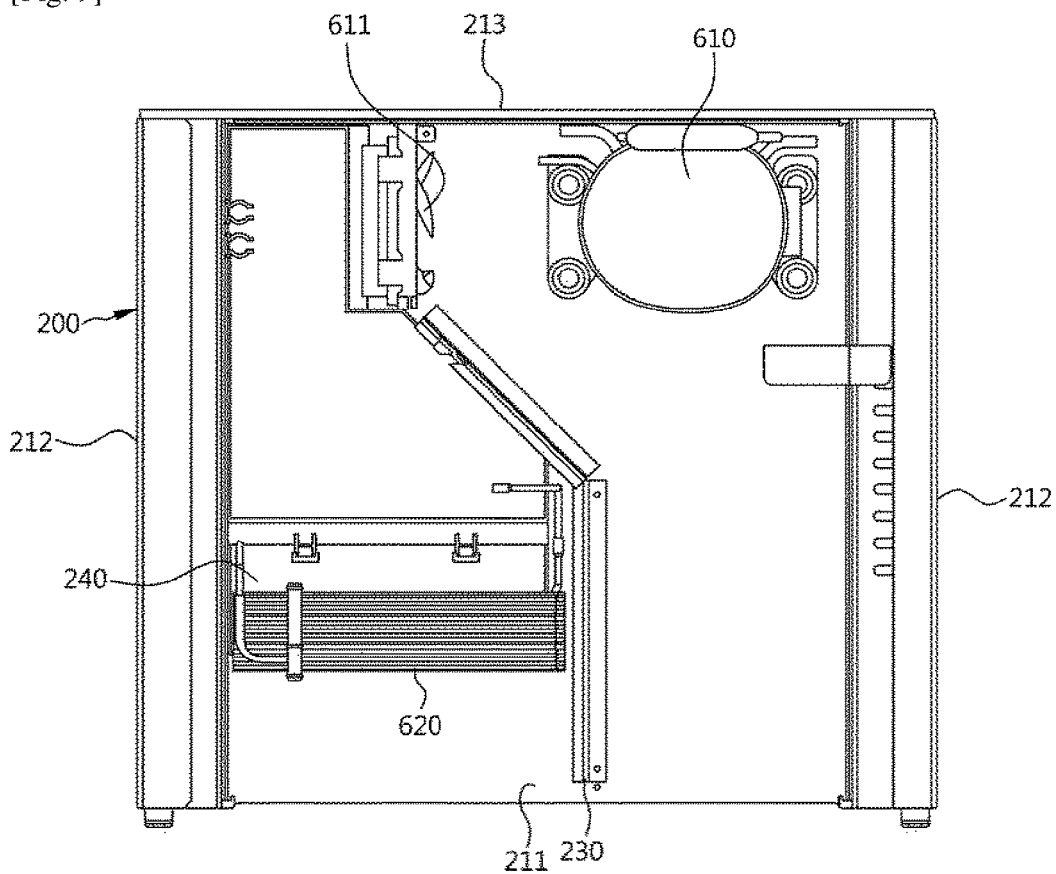

[Fig. 10]
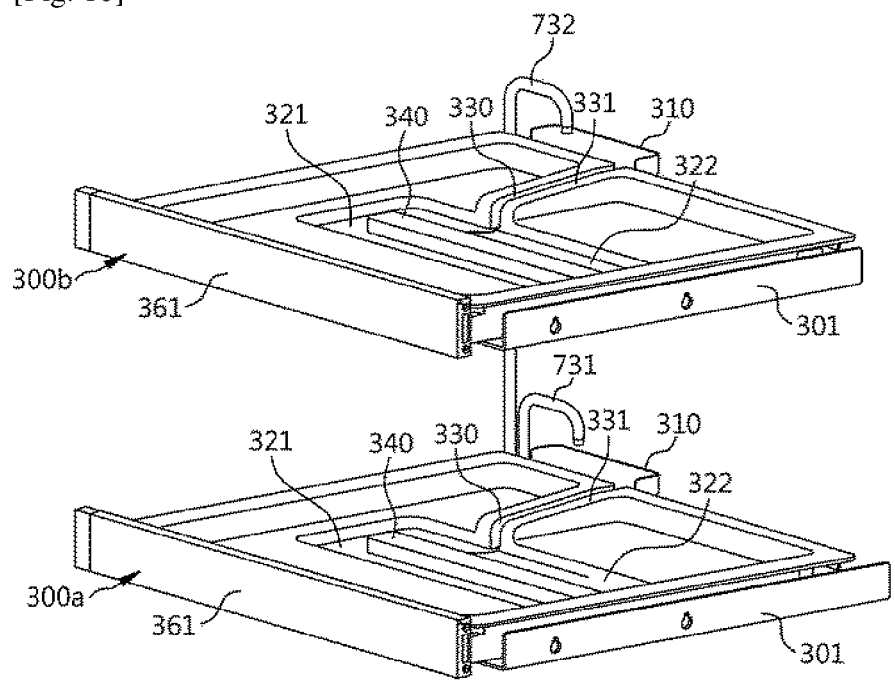
[Fig. 11]
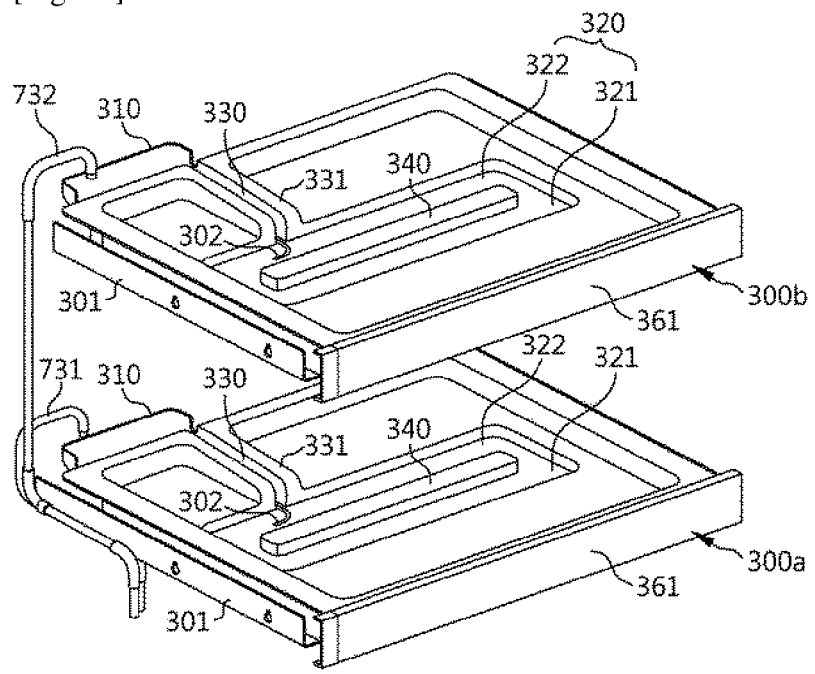

[Fig. 12]
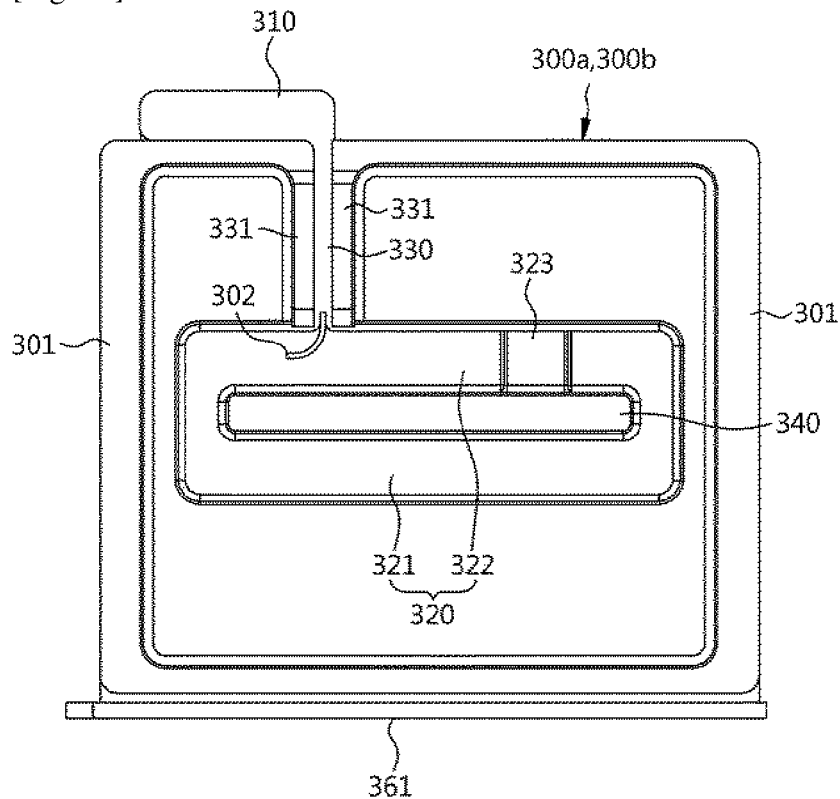
[Fig. 13]
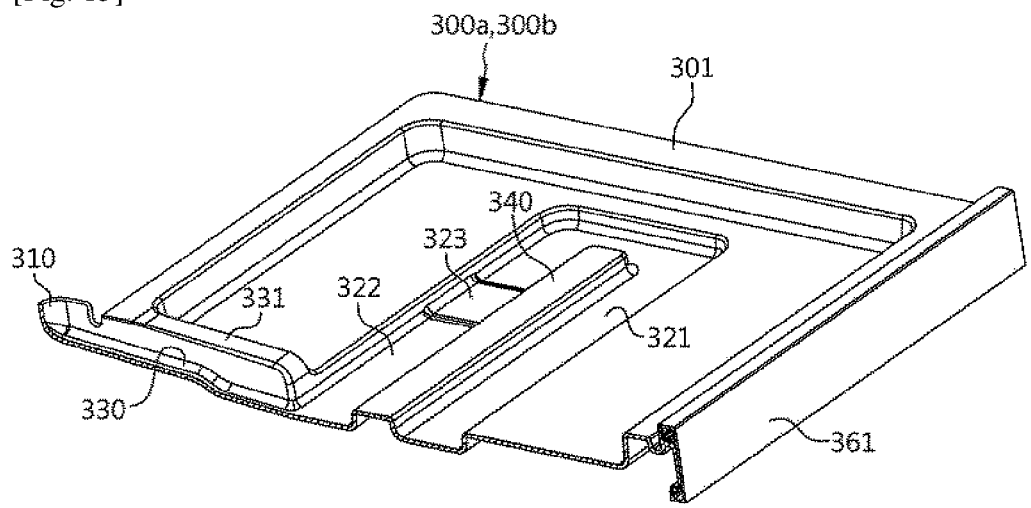
[Fig. 14]
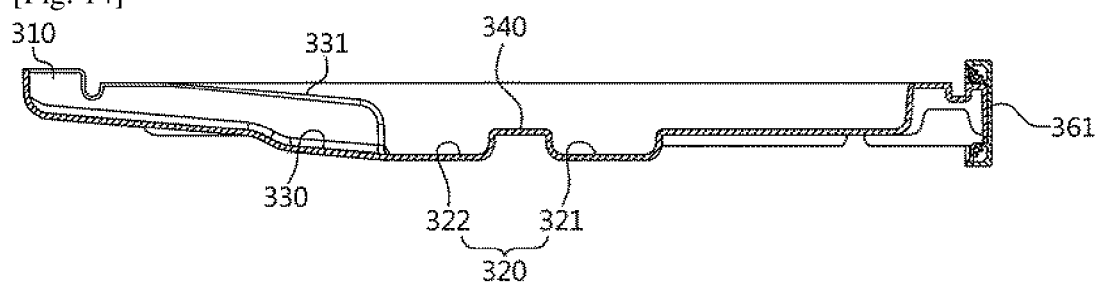

[Fig. 15]
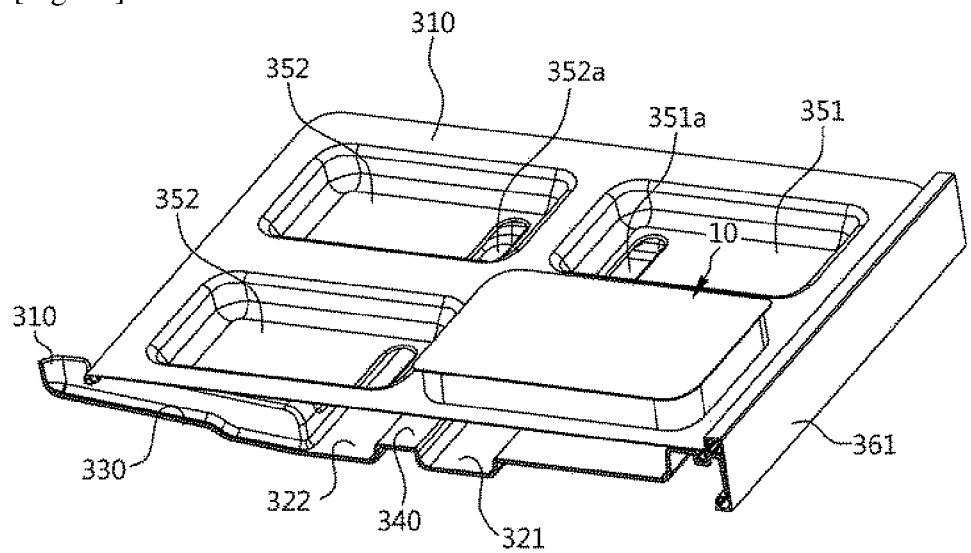
[Fig. 16]
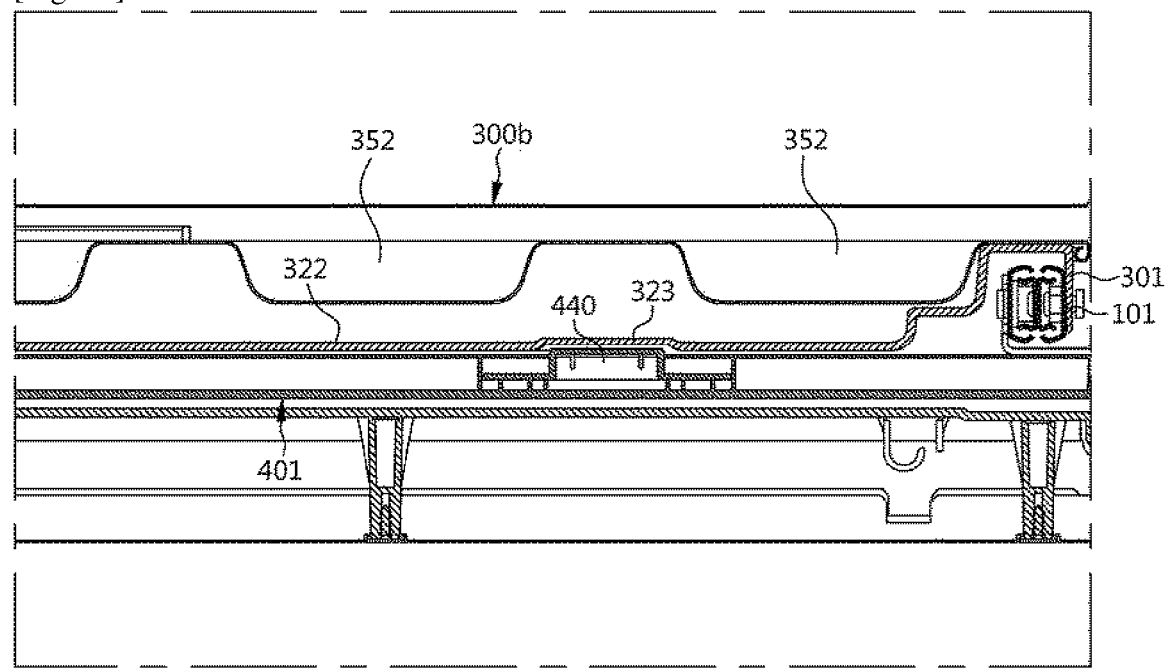

[Fig. 17]
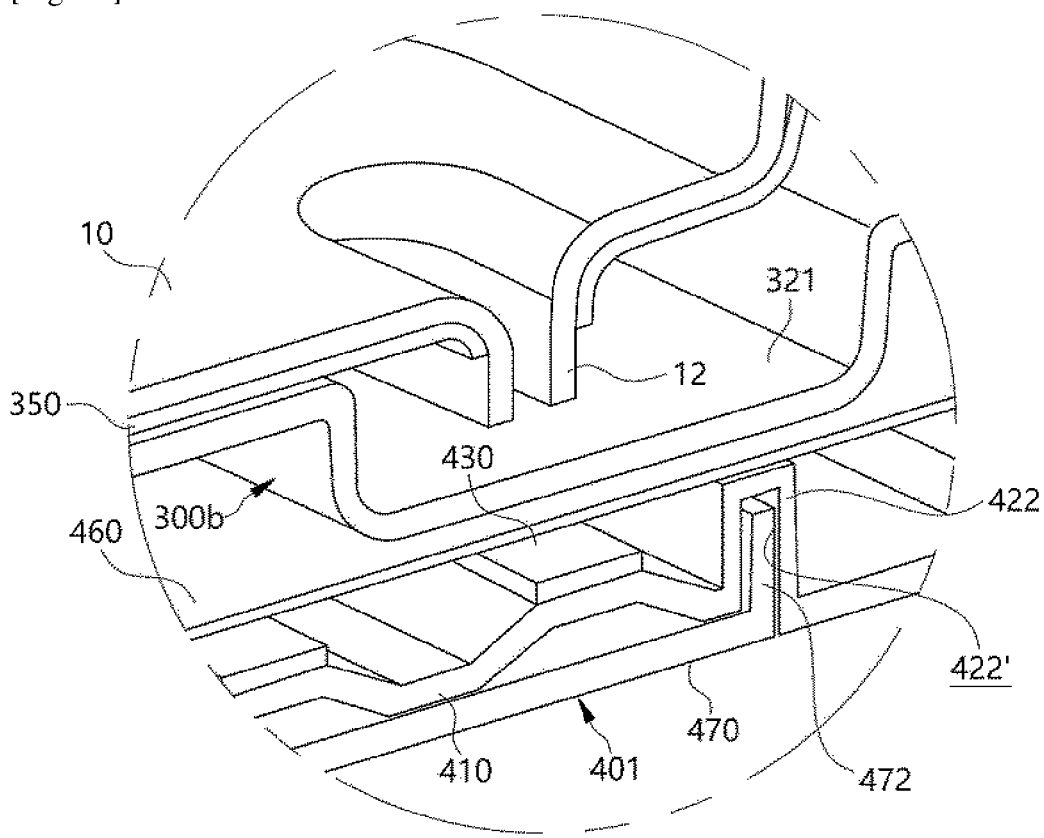
[Fig. 18]
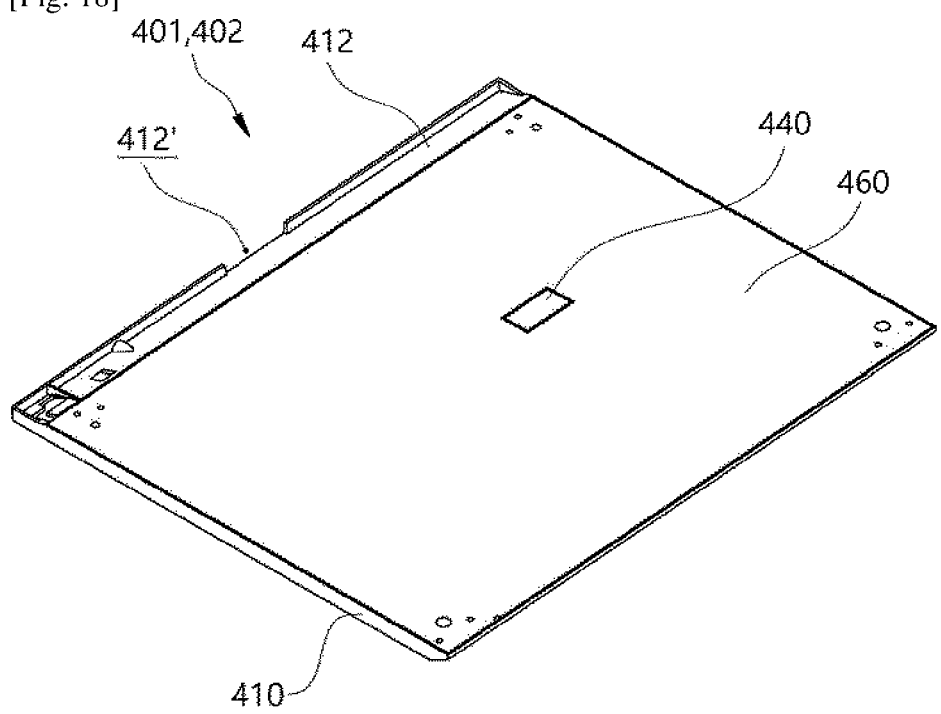

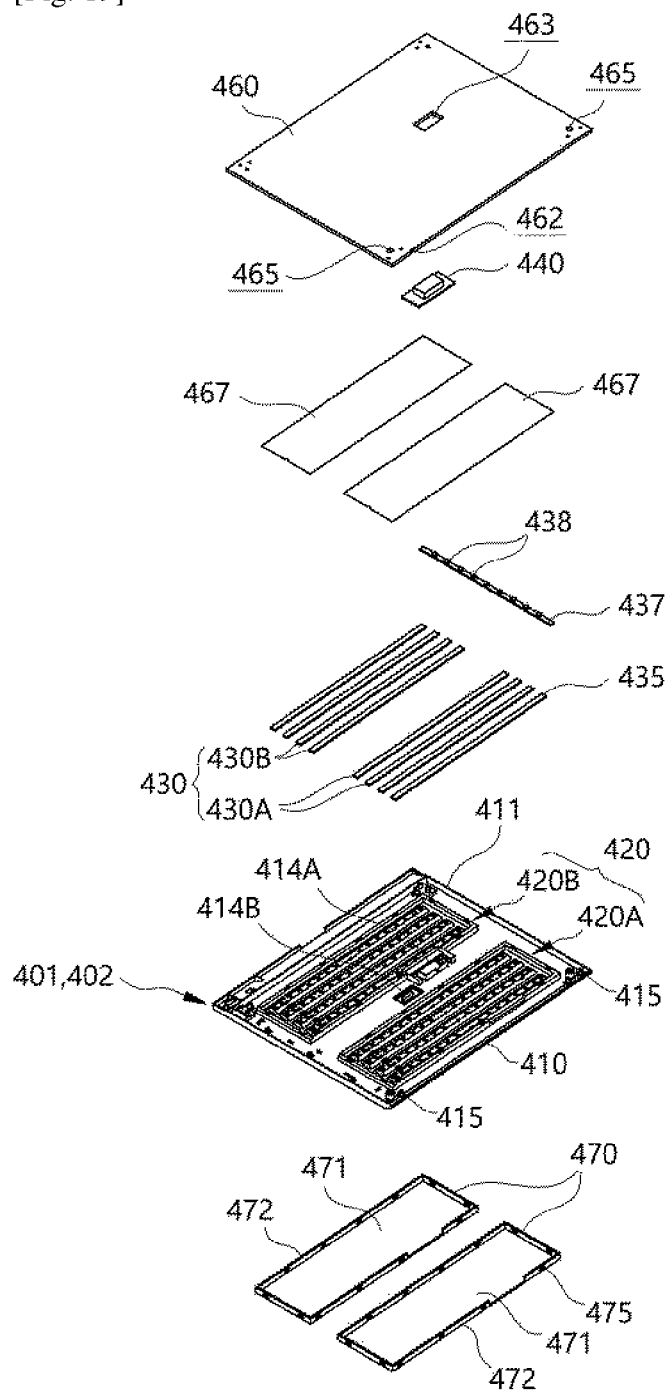

[Fig. 20]
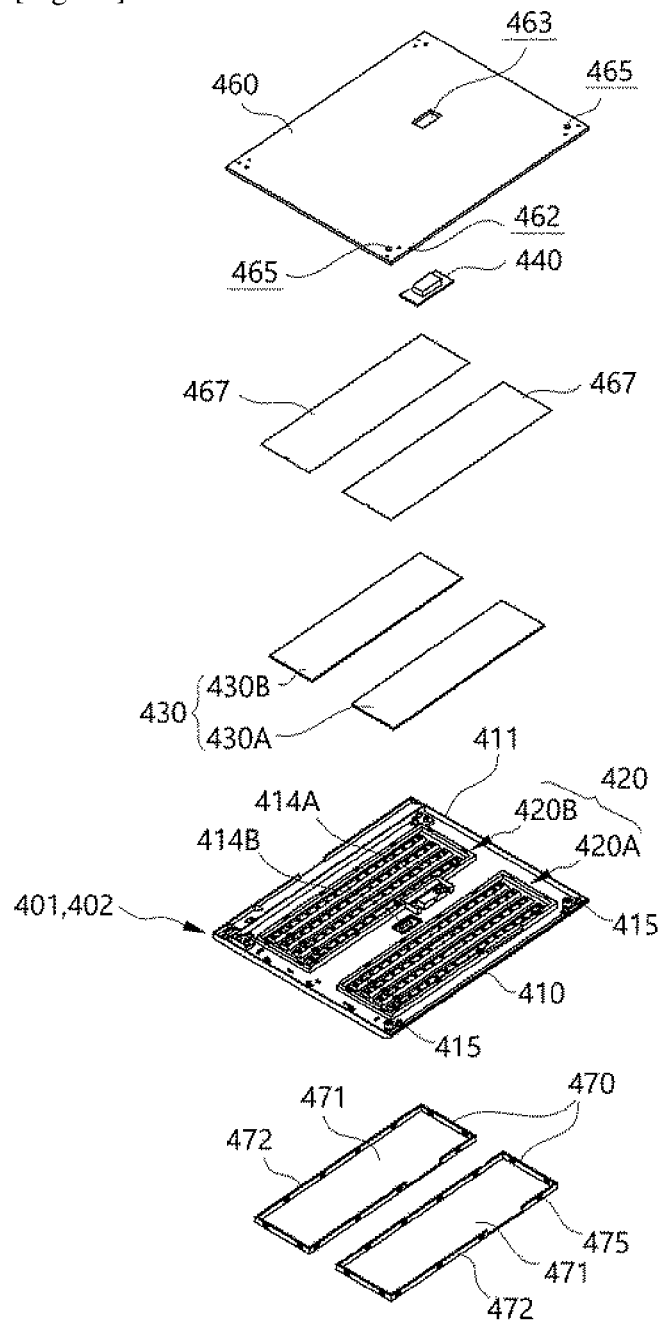

[Fig. 23]
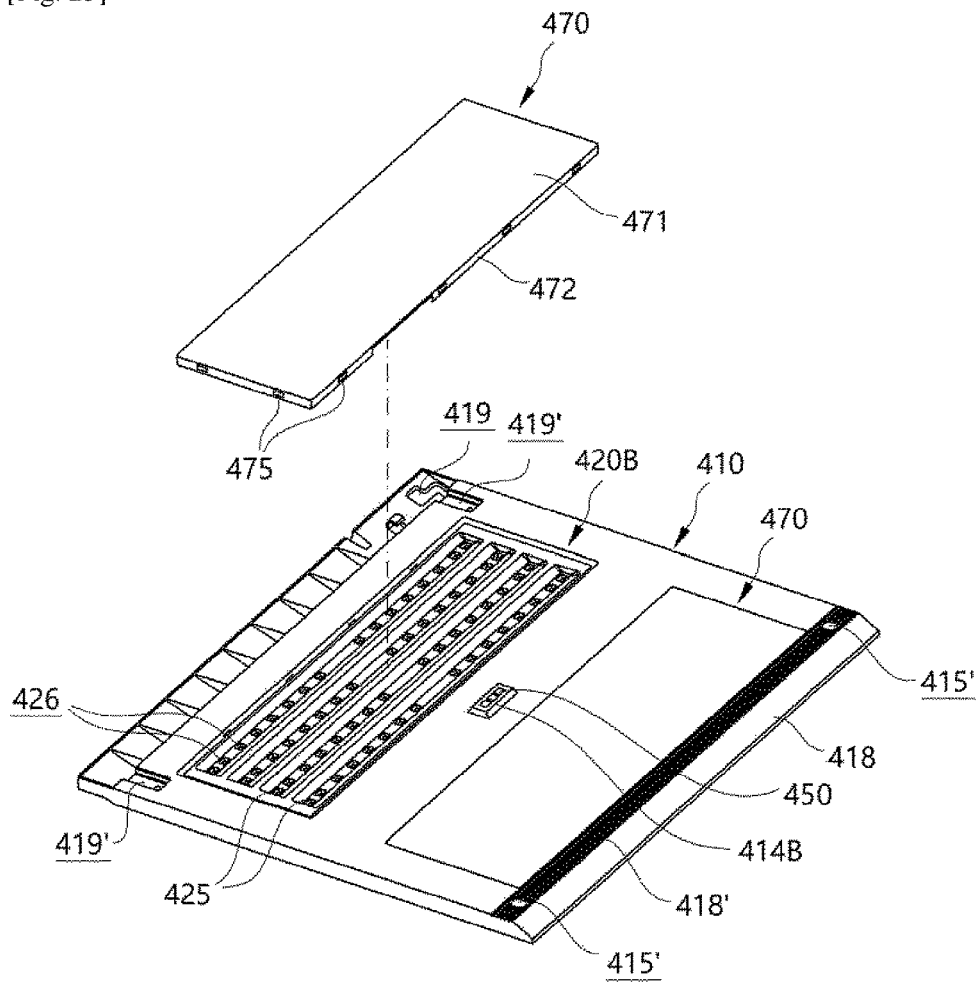
[Fig. 24]
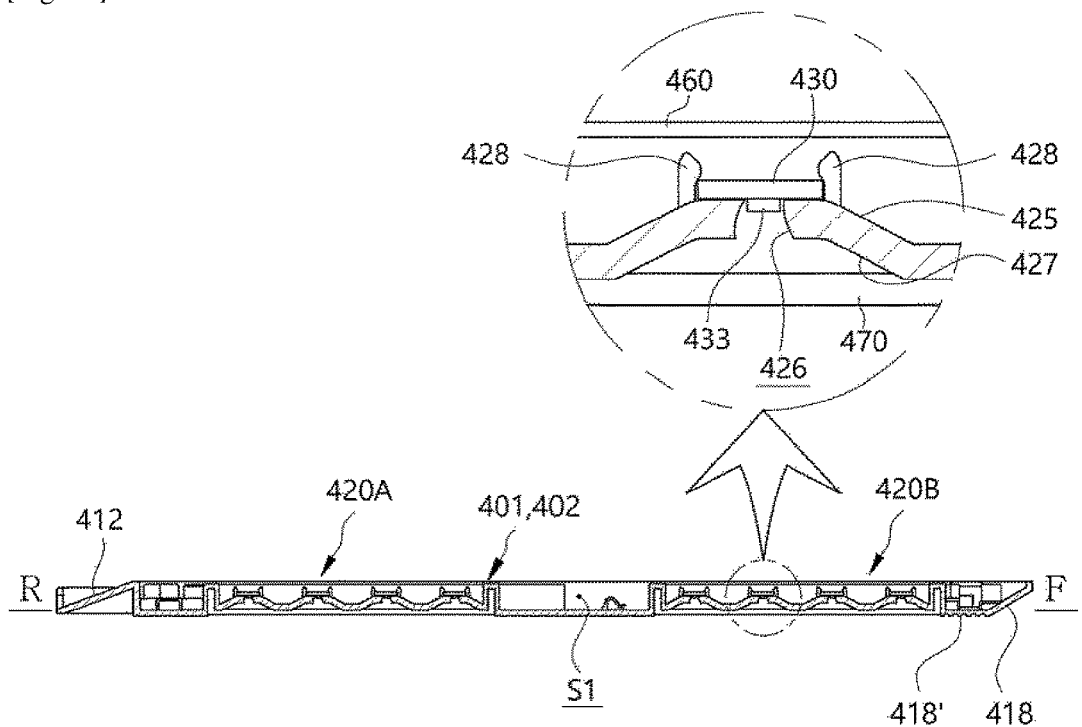

[Fig. 25]
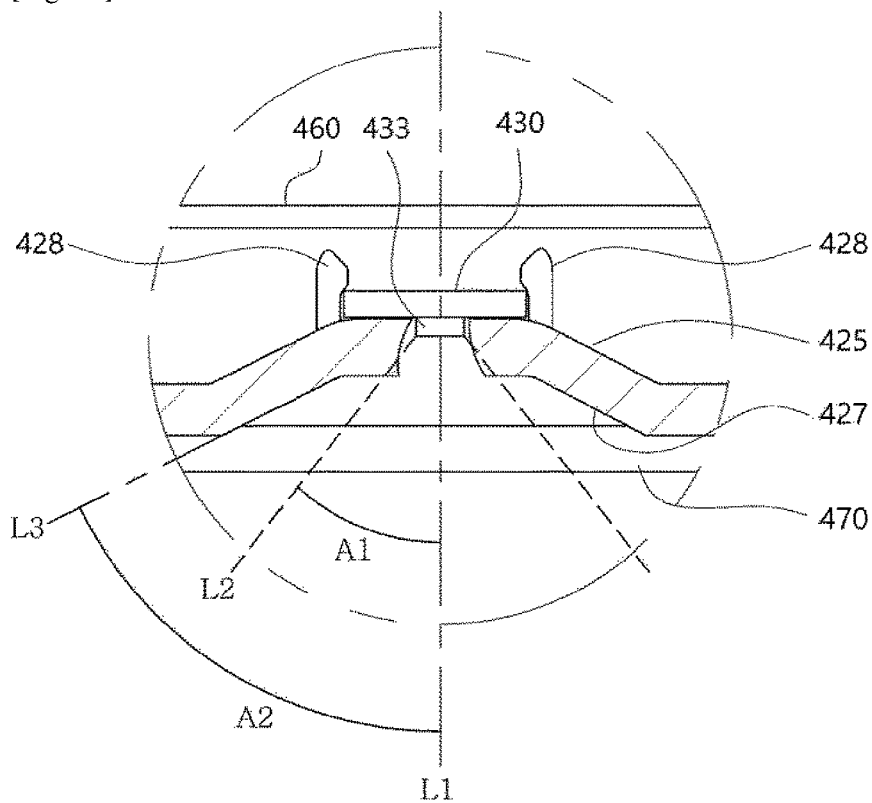
[Fig. 26]
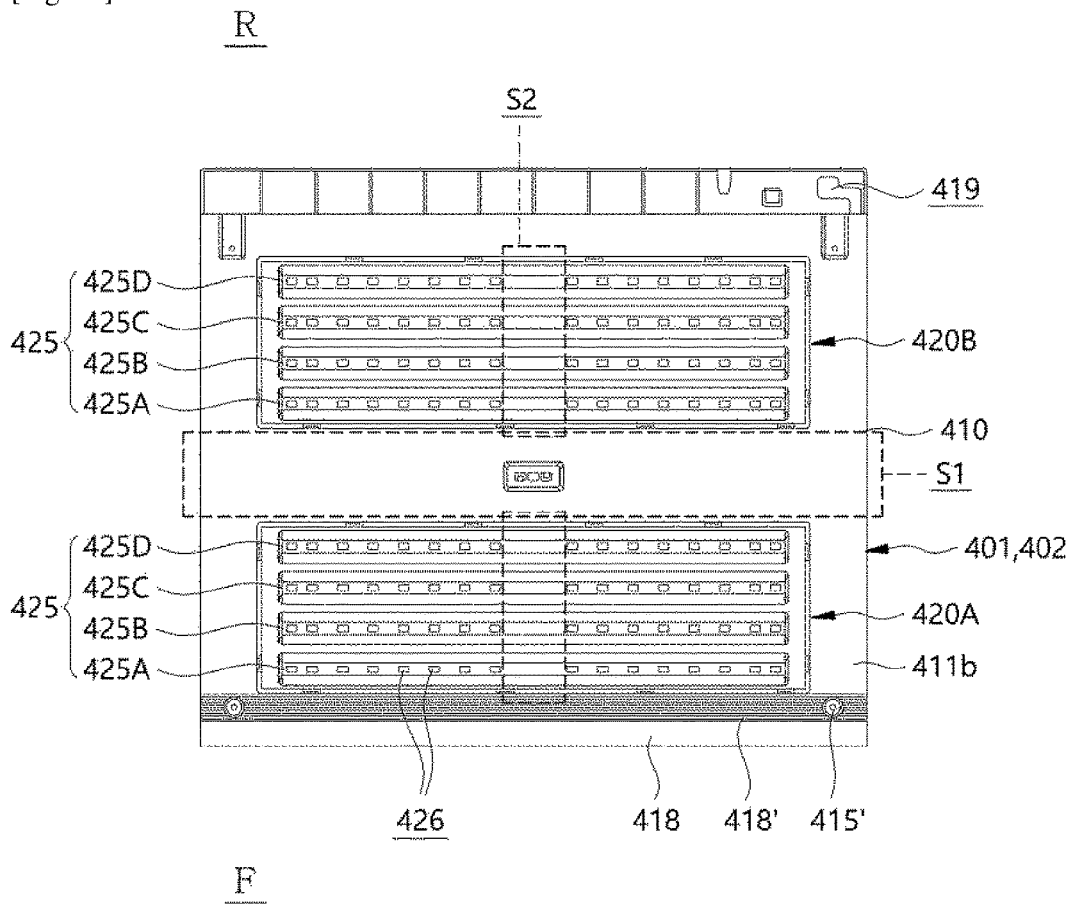

[Fig. 27]
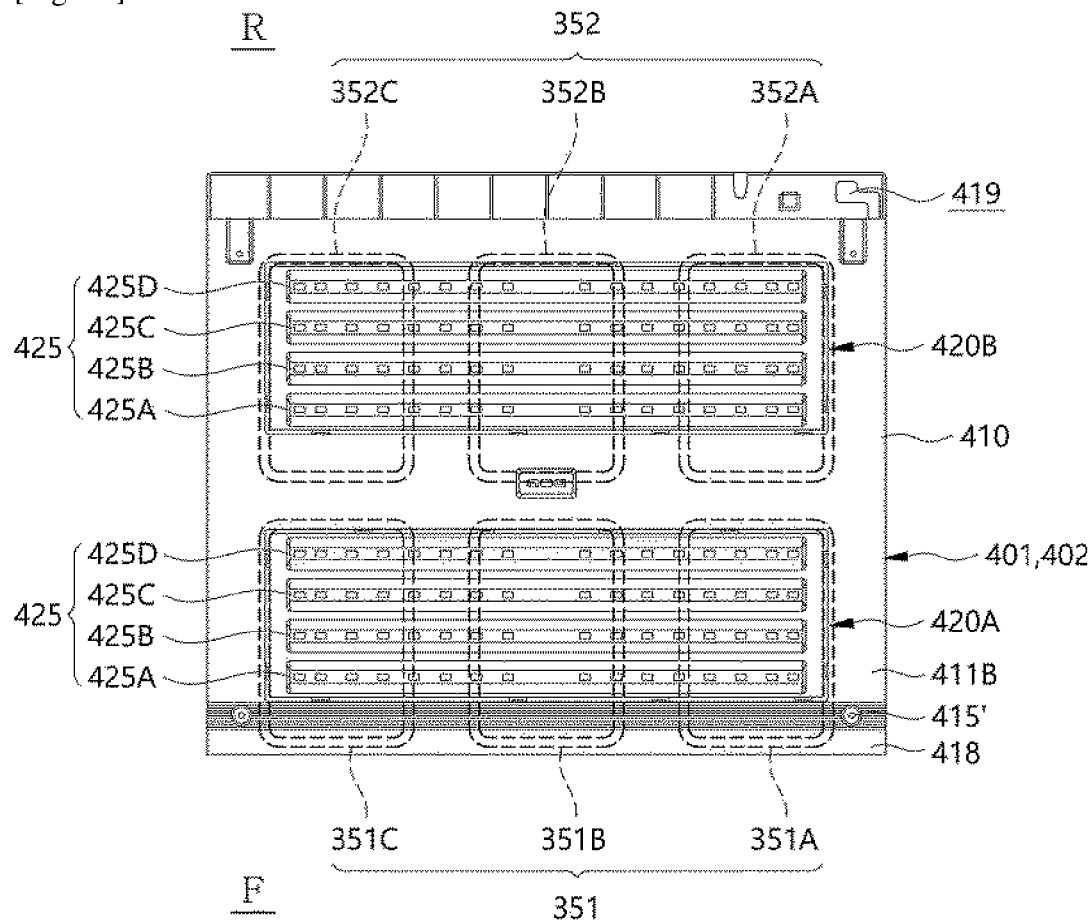
[Fig. 28]
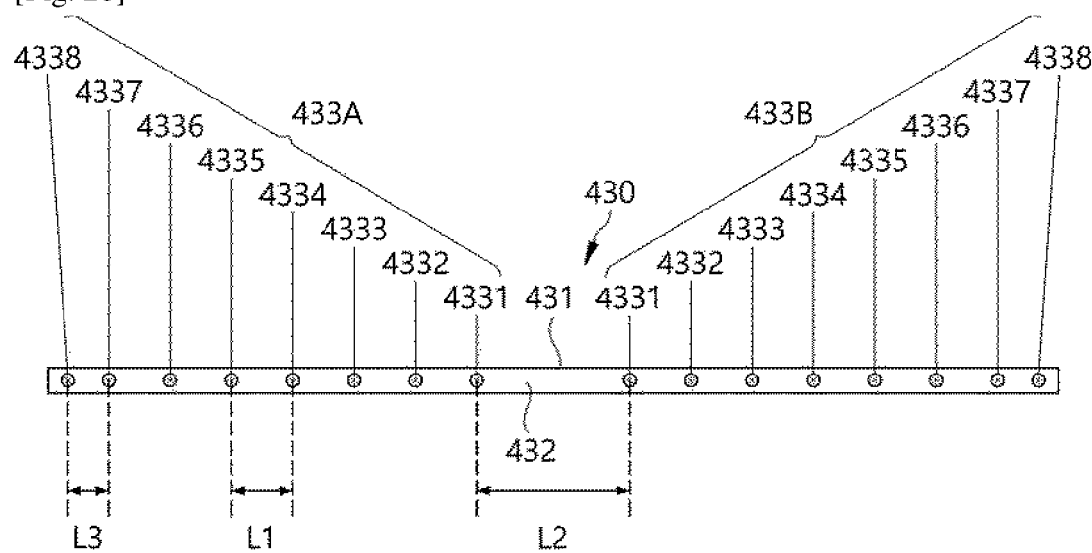

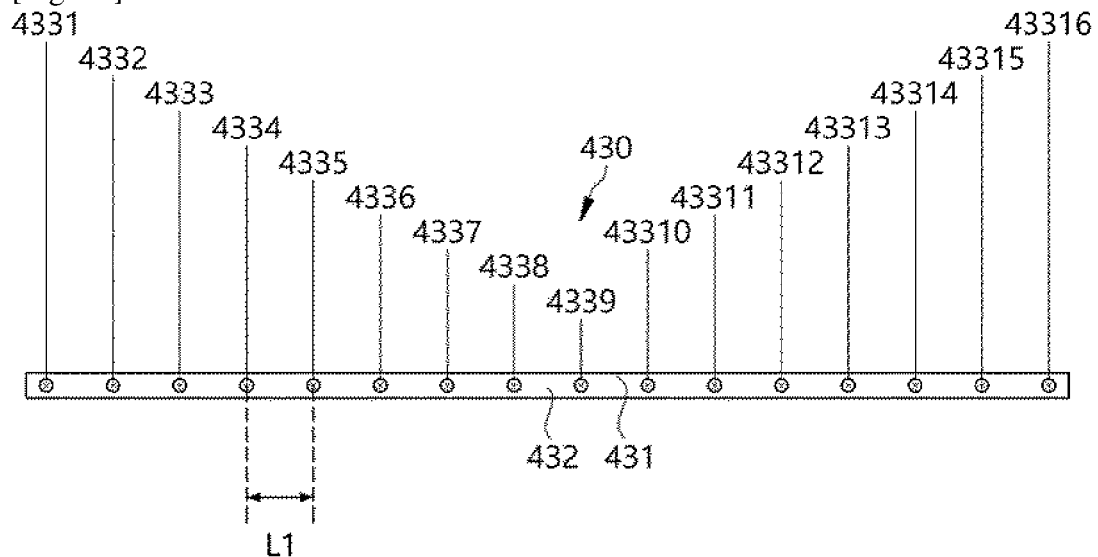
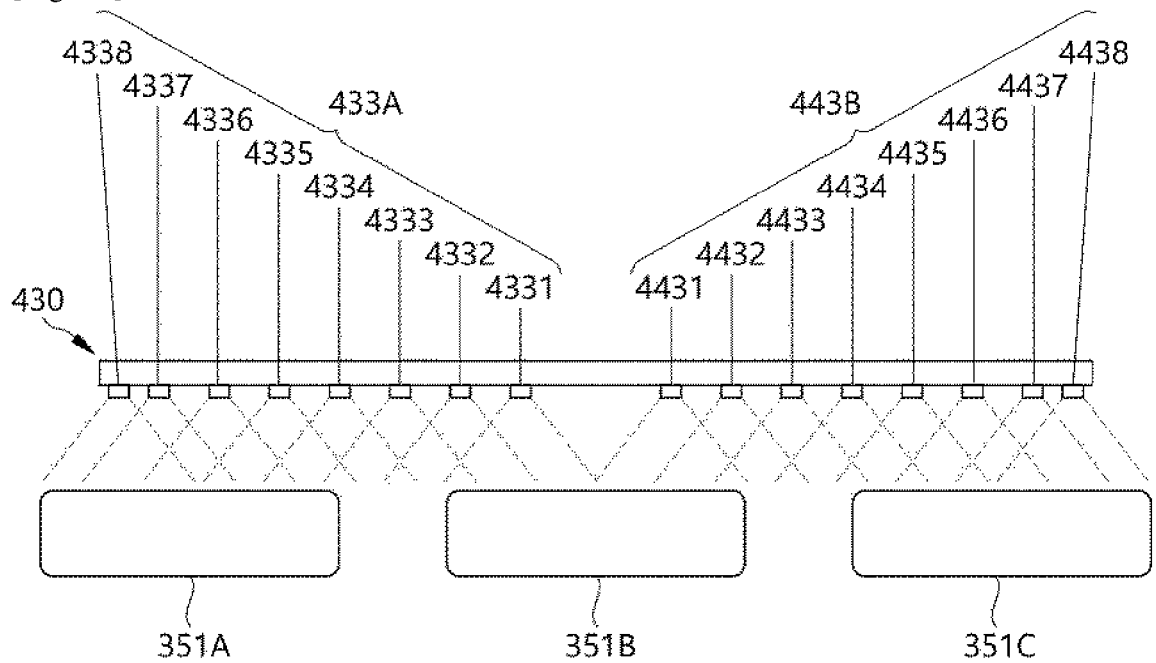

[Fig. 31]
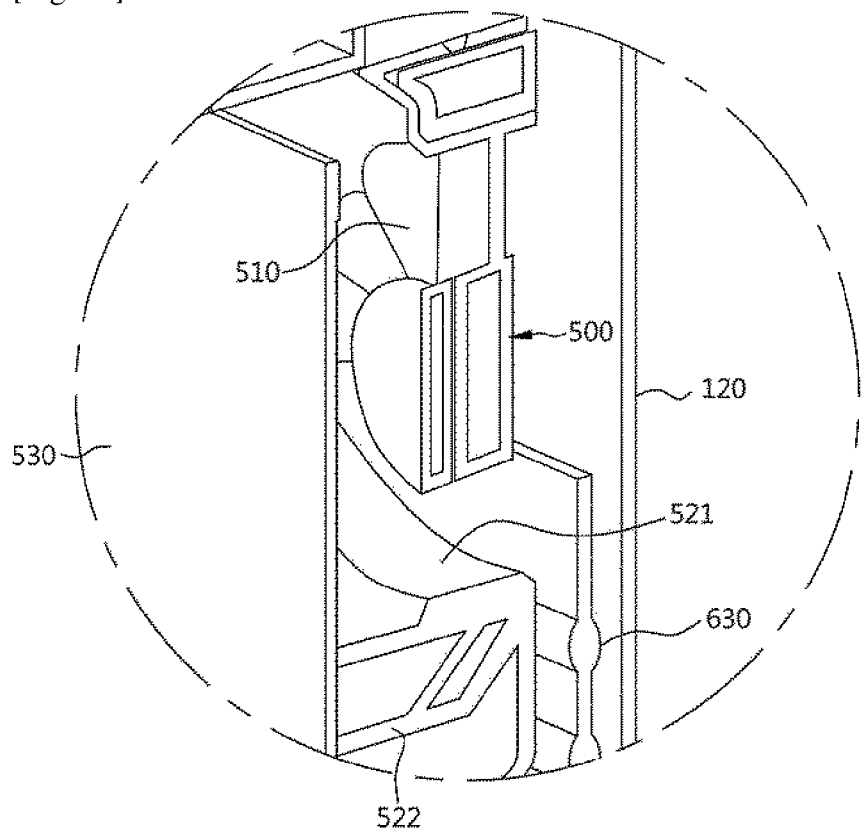
[Fig. 32]
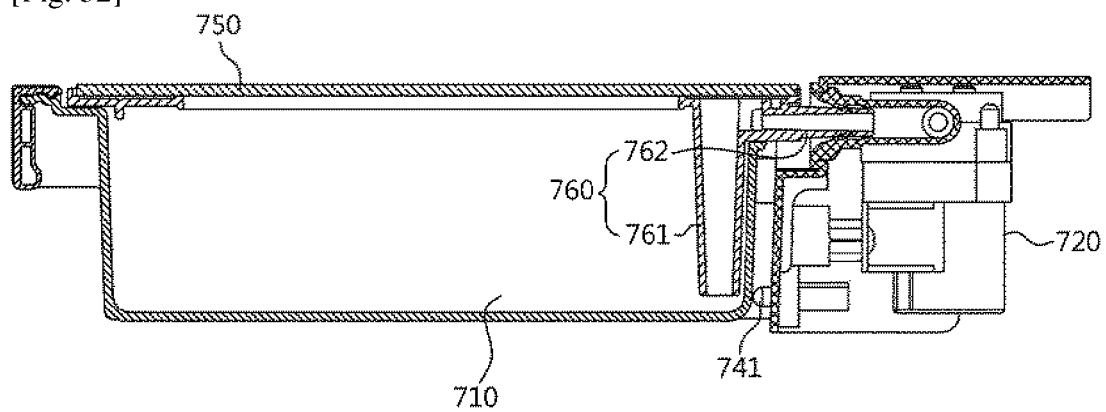

[Fig. 33]
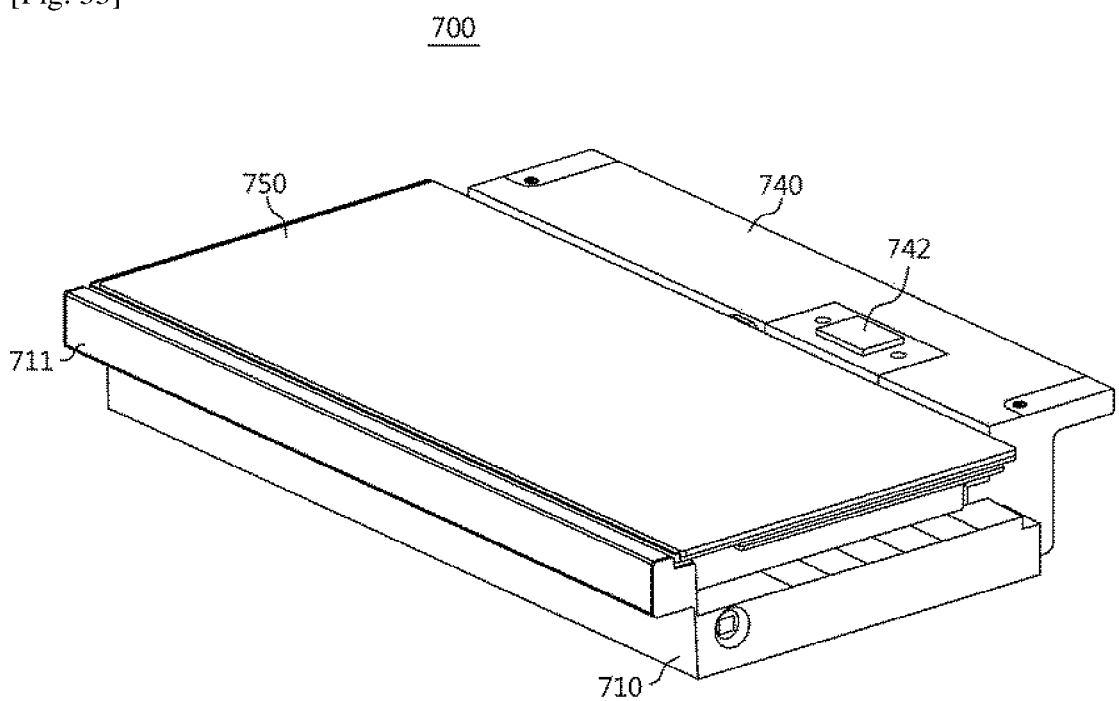
[Fig. 34]
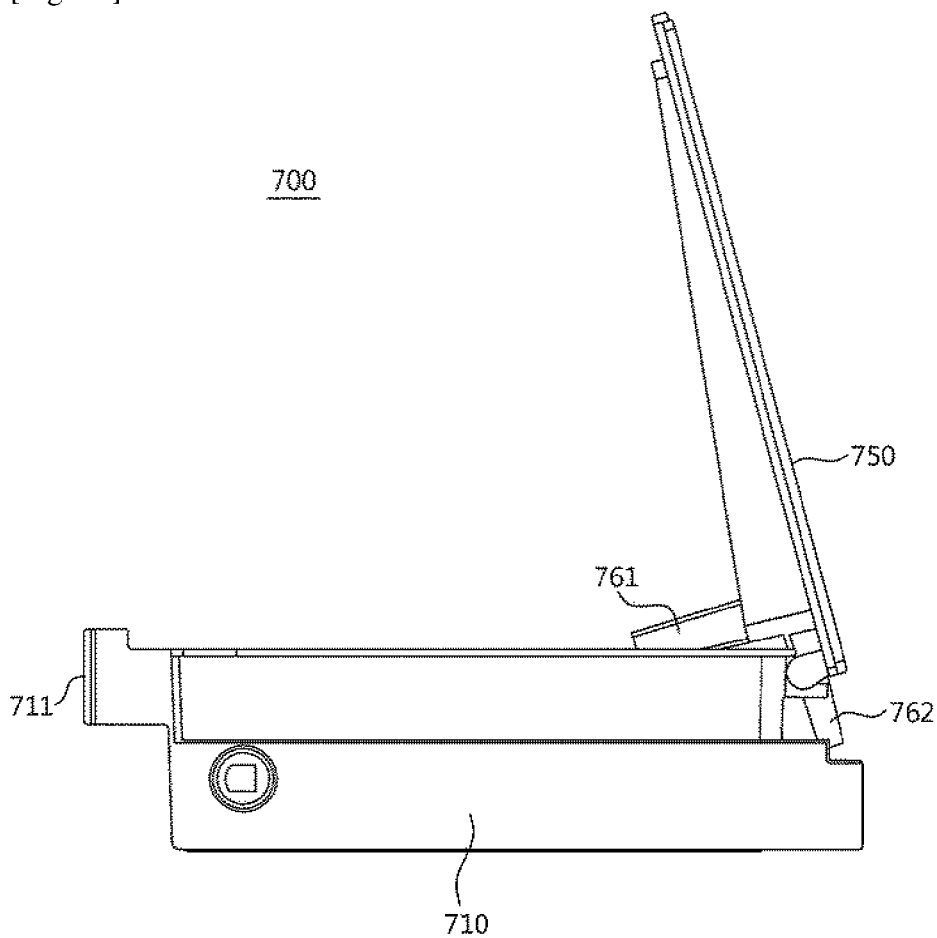

[Fig. 35]
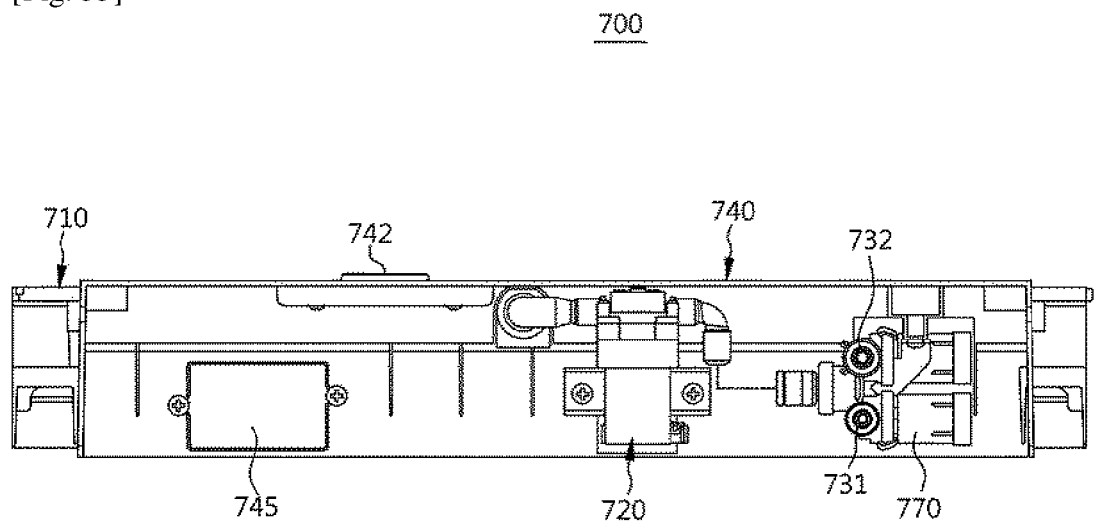
[Fig. 36]
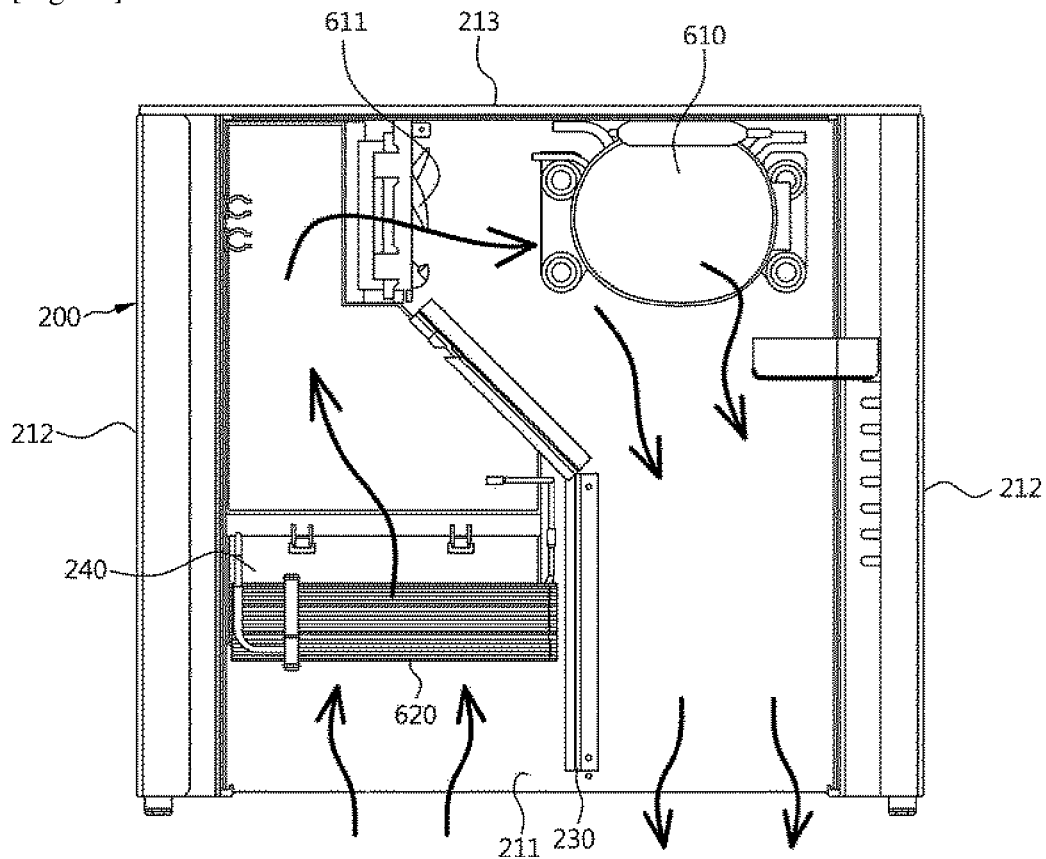

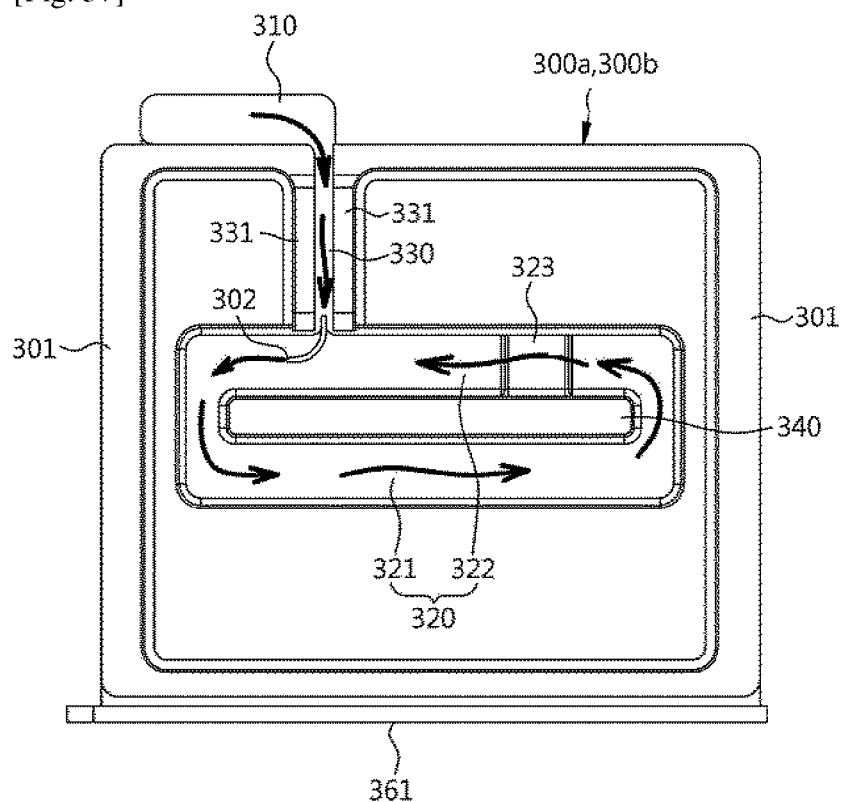
[Fig. 37]

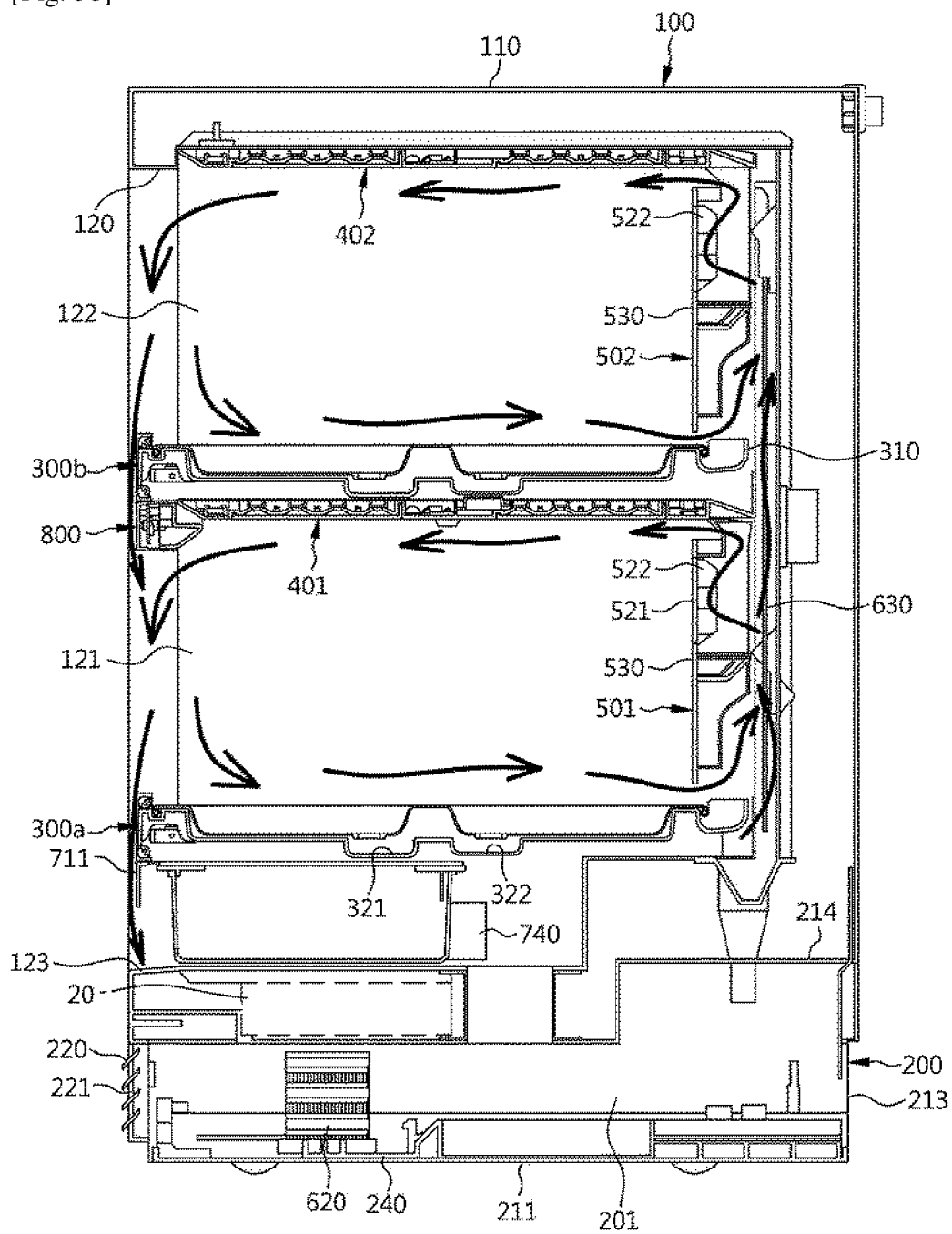
[Fig. 38]

PLANT CULTIVATION APPARATUS

CROSS-REFERENCE TO RELATED PATENT APPLICATIONS

This application is a U.S. National Stage Application under 35 U.S.C. § 371of PCT Application No. PCT/KR2020/013274, filed Sep. 28, 2020, which claims priority to Korean Patent Application No. 10-2019-0138817, filed Nov. 1, 2019, whose entire disclosures are hereby incorporated by reference.

TECHNICAL FIELD

The present disclosure relates to a plant cultivation apparatus capable of cultivating plants while automatically performing air circulation, light supply, and water supply.

BACKGROUND ART

In general, a plant cultivation apparatus is a device cultivating plants in a seed state.

Recently, the plant cultivation apparatus has been provided in various forms that may easily cultivate plants indoors.

The indoor plant cultivation apparatus may be classified into a hydroponic cultivation apparatus and a soil cultivation apparatus.

The hydroponic cultivation apparatus is a device that cultivates a plant by a method in which roots of a plant are immersed in water mixed with a nutrient solution, as proposed in Korean Patent Application Publication No. 10-2012-0007420 (document 1), Korean Patent Application Publication No. 10-2012-0028040 (document 2), Korean Patent No. 10-1240375 (document 3), and Korean Patent No. 10-1422636 (document 4).

Further, the soil cultivation apparatus is a device using a cultivation method of planting a plant (or seeds) in soil of a pot and continuously supplying water to the pot, as proposed in Korean Patent No. 10-1400375 (document 5), Korean Utility Model Registration No. 20-0467246 (document 6), and Korean Utility Model Registration No. 20-0465385 (document 7).

Meanwhile, the above plant cultivation apparatus may be divided into an open-type cultivation apparatus in which a cultivation space thereof is open indoors and a closed-type cultivation apparatus in which a cultivation space thereof is closed from the indoor.

In document 2, the open-type cultivation apparatus is proposed. In other documents (document 1, and documents 3 to 7) the closed-type cultivation apparatus having a door is proposed.

In the case of the open-type cultivation apparatus, the apparatus is open indoors, and the apparatus is configured to cultivate plants under the same temperature condition as the indoor temperature. In the case of the closed-type cultivation apparatus, the apparatus is configured to cultivate plants in the cultivation space closed from the indoor and under a different temperature condition from the indoor temperature.

In particular, since the plants in the open-type cultivation apparatus are affected by the indoor temperature, the apparatus has a problem that the apparatus should be controlled to match with the indoor environment for plant cultivation. In addition, the open-type cultivation apparatus has a problem such as odor due to contamination of supply water during plant cultivation.

Accordingly, a general plant cultivation apparatus used at home may be configured as the closed-type cultivation apparatus and as an automatic apparatus that automatically controls temperature, humidity, and a light source.

However, conventionally, since lighting devices installed in the plant cultivation apparatus are integrally formed with the plant cultivation apparatus, various components should be disassembled for maintenance thereof, so that usability and maintainability are reduced and even when a part of light sources is damaged, the entire device should be replaced.

Further, the conventional plant cultivation apparatus has a problem in that the amount of light is not evenly supplied to plants arranged in the apparatus. For example, a lighting device having a plurality of light sources should be used to evenly provide artificial light to the plants arranged in various positions (beds). The amount of light is large in a section in which artificial light emitted from the plurality of light source overlaps, but the amount of light is relatively small in a section where the light does not overlap. Accordingly, growth rate of the plants is not constant.

In the conventional plant cultivation apparatus, the plurality of light sources provided in the lighting device emits light more widely and emits light on an inner wall of the plant cultivation apparatus. Accordingly, the lighting device is decreased in efficiency, and light emitted to the peripheral and reflected on the plant cultivation apparatus so that aesthetic sense is reduced.

The inside of the closed-type cultivation device is a high humidity adversely affects lighting devices due to the supply water. The high humidity adversely affects lighting device. For example, due to high humidity, the circuit board constituting the lighting device may be damaged.

An evaporator constituting the freezing cycle may be positioned in rear of the lighting device. Moisture condensed in the evaporator may fall to the lighting. Moisture may not be discharged and stays on the upper portion of the lighting device to generate odor.

DISCLOSURE OF INVENTION

Technical Problem

Accordingly, the present disclosure has been made keeping in mind the above problems occurring in the related art, and the present disclosure is intended to modularize a plant cultivation apparatus in a removable and assembled state.

Another objective of the present disclosure is to provide a plant cultivation apparatus in which artificial light emitted from a light source of a lighting device is evenly emitted to beds on which plants are planted.

A further objective of the present disclosure is to provide a plant cultivation apparatus, wherein artificial light emitted from the light source of the lighting device is concentrated in the beds without being distributed to the periphery.

A further objective of the present disclosure is to provide a plant cultivation apparatus, wherein moisture is prevented from entering a light source installation part of the lighting device.

A further objective of the present disclosure is to provide a plant cultivation apparatus, wherein even when moisture falls on the lighting device, the moisture is discharged through a drainage structure.

Solution to Problem

In order to accomplish the above object, the present disclosure provides a plant cultivation apparatus including a lighting module provided above a bed in a cabinet and providing lighting for plant cultivation. The lighting module may be configured as one module including a light source part having a plurality of light sources, a lighting casing in which the light source part is provided, and a lighting cover coupled to the lighting casing and covering the light source part. The lighting module may be provided in the cabinet in a removably manner.

The light source part may include the plurality of light sources, and among the light sources, light sources emitting light toward a center of the bed may be arranged at relatively wider intervals than intervals of light sources arranged adjacent thereto.

The light source part may include a light array in which the plurality of light sources may be arranged in one direction, and a plurality of light arrays may be arranged in the lighting casing while being spaced apart from each other. Accordingly, management may be performed for each light array, and installation of the light source part may be made easy.

Among the plurality of light sources provided in the light array, light sources arranged in a center portion of the light array may be arranged at wider intervals than intervals of light sources arranged in opposite sides of the center portion of the light array, so that light may be evenly emitted to plants positioned at various positions.

On the center portion of the light array, the light sources arranged in the center portion may be spaced apart from each other to provide a light source separation part, and a pod positioned in a center of the pods provided below the lighting module may be positioned below the light source separation part. The bed positioned at the center may have sufficient illuminance because light is emitted from many surrounding light sources despite the light source separation part.

Among the plurality of light sources provided in the light array, light sources arranged in edges of the light array may be arranged at relatively narrower intervals than intervals of light sources arranged other positions. The light sources at the edge may be arranged relatively densely so that the amount of light may not be insufficiently supplied thereto because the degree of overlapping of emitted light is less in the center than the edge.

Among the plurality of light sources provided in the light array, light sources arranged in a center portion of the light array may be controlled to have low illuminance or to be limited in power supply than light sources arranged opposite sides of the center portion of the light array. Therefore, it is possible to evenly provide the illuminance to the plants without changing intervals between the light sources.

A plurality of light arrays constitutes one light source group, and the light source group is spaced apart from another adjacent light source group to provide a non-lighting section in a gap between the light source group and the adjacent light source group. The non-lighting section may be a section below which plants are not provided, so energy efficiency may be increased by omitting the light sources here.

Among the pods provided below the lighting module, a pod arranged in an outermost side may be configured to protrude relatively outward than the light source part, so that the inside space in the cultivation room may be used more widely.

A light source installation part may be provided in the lighting casing of the lighting module, the light source part may be provided in the light source installation part and an upper cover covers one side of the light source installation part, and the light source installation part may have light source holes that may be open so as to allow the plurality of light sources constituting the light source part to be exposed toward the bed, and a light source guide may be provided at an edge of each of the light source holes in an inclined direction. The light source guide may allow the emitted light to be concentrated to the plants.

The light source guide may be extended at a wider angle than a light emitting angle of each of the light sources.

The light source guide may be extended to be symmetric to opposite sides with respect to the light source hole positioned in a center, and may be extended to be inclined in a direction away from the lighting cover as the light source guide goes toward the light source hole. Whereby, the light sources do not emit light to unnecessary portions such as a side surface of the cultivation room, and may be emit light intensively toward the plants.

A partition fence may protrude while surrounding the light source installation part in the lighting casing, and an upper surface of the partition fence may be in close contact with the upper cover. Through the structure, moisture or foreign matter may be prevented from entering the light source part.

A wire guide part may be provided along an edge of the lighting casing of the lighting module, and the wire guide part may have a hook for fixing a wire harness seated on the wire guide part, so that the wire harness may be fixed stably.

the lighting casing may have a wire through hole through which the wire harness passes, and the wire through hole may be provided in the wire guide part or at a position that is adjacent to the wire guide part, so that convenience of installation of the lighting module may be increased.

In the lighting casing constituting the lighting module, a drainage guide may be provided in a downward inclined direction along an edge positioned inside the cultivation room, and a drain hole may be open at one side of the drainage guide. The drainage guide may flow moisture falling on the lighting module downward.

In the lighting module, the lighting cover formed of a transparent material may be coupled to an outer surface thereof facing the bed and cover the light sources exposed toward the bed. The lighting cover may prevent high humidity in cultivation room from being transmitted directly to the light sources.

A sensor may be provided in the lighting casing constituting the lighting module. A temperature sensor may be provided in a center of the lighting casing constituting the lighting module, the temperature sensor being exposed toward the bed, and the lighting casing constituting the lighting module may have a residual water detection sensor that may protrude toward the bed stacked on an upper portion of the lighting module. The sensors may detect environment conditions in the cultivation room and help automatic control.

The light source part may include a circuit board in which the plurality of light sources may be provided, and in the circuit board, at least one light array in which the plurality of light sources may be arranged in one direction is provided. The light sources may be installed through the circuit board, so that installation and maintenance of the light sources may be performed easier.

An insulating cover may be provided between the light source part of the lighting module and the upper cover. The insulating cover may insulate between the light source part and the periphery to increase the stability and reliability of the lighting module.

Advantageous Effects of Invention

As described above, the plant cultivation apparatus of the present disclosure has various effects as follows.

In the plant cultivation apparatus of the present disclosure, the lighting module provided for emitting artificial light is modularized and installed so that the lighting module can be removed and assembled. Accordingly, the maintenance of the plant cultivation apparatus is improved because only the lighting module needs to be removed without disassembling the entire plant cultivation apparatus for the maintenance of the lighting module.

The lighting module constituting the present disclosure is provided in the plant cultivation apparatus and divides the cultivation room into two spaces. As described above, since the lighting module is disposed between the two cultivation rooms and divides the two cultivation rooms, there is no need to install a separate partition wall in the plant cultivation apparatus, and the number of components and assembly man-hour are reduced.

The lighting module of the present disclosure has a plurality of light sources (LED), the light sources are not arranged at equal intervals, and a part of light sources at the center is arranged at a wider interval than that of the remaining light sources. Accordingly, the center light sources may prevent artificial light from being provided to the plants positioned at the center of the cultivation room while excessively overlapping, and reduces the standard deviation of illuminance to grow the plants in the cultivation room uniformly.

The lighting module of the present disclosure has the non-lighting section in which the light sources are not arranged and the light source separation part, and the spaces are formed along sections at a lower portion thereof in which the plants are not arranged. That is, energy efficiency can be increased by omitting the light sources in the section where the plants are not provided, and space utilization can be improved by installing the sensors using empty spaces.

The lighting module of the present disclosure has the light guide that guides emitting of the light sources and is formed in an inclined direction based on the light sources, so that artificial light emitted from the light sources is concentrated to the bed without being distributed to the periphery such as a side surface or an upper surface of the cultivation room. Accordingly, it can be prevented that light is reflected to unnecessary spaces in the cultivation room to damage the aesthetic sense or to reduce energy efficiency.

The lighting cover is assembled to a lower side of the lighting module of the present disclosure, and the upper cover is assembled to an upper side thereof to seal the light source installation part. Accordingly, it is possible to prevent damage or malfunction of the light sources due to moisture or foreign matter entering the light source installation part in which the light sources are provided.

The light source part constituting the lighting module of the present disclosure includes the plurality of light source groups, and the light source groups may include a separate circuit board. Accordingly, when some of the light sources are damaged or have reached the end of their life, only some of the necessary light source parts can be replaced without replacement of the entire light source part. Accordingly, maintenance of the lighting module is made easier.

The plant cultivation apparatus of the present disclosure has a plurality of lighting modules, and the lighting modules have the same structure. Accordingly, the lighting module can be used in common, so that there is no necessary to design and manufacture differently for each lighting module, and productivity of the plant cultivation apparatus is improved.

The plant cultivation apparatus of the present disclosure has the sensors, and among the sensors, the temperature sensor is provided in the position corresponding to the center of the cultivation room so that precise temperature measurement can be performed, and the residual water detection sensor is provided to be naturally inserted into a sensing part of the bed that is stacked above the lighting module. Accordingly, there is no necessary to provide a separate space for installation of the sensors, and the sensors can be installed using the lighting module constituting a part of the cultivation room, so that space utilization rate can be improved and precise sensing can be performed.

The drainage guide is provided in the lighting module of the present disclosure to discharge moisture falling on the lighting module. In particular, even when water generated from the evaporator that is adjacent to the rear of the lighting module, the water can be discharged downward through the drainage guide without flowing into the lighting module, so that odor or damage to the lighting module can be prevented from caused by residual water.

BRIEF DESCRIPTION OF DRAWINGS

FIG. 3 is a perspective view showing the exterior of the plant cultivation apparatus according to the embodiment of the present disclosure, the plant cultivation apparatus in a state in which the door thereof is opened;

FIG. 4 is a front section view showing a pod of the plant cultivation apparatus according to the embodiment of the present disclosure;

FIG. 5 is a side section view showing the pot of the plant cultivation apparatus according to the embodiment of the present disclosure;

FIG. 6 is a side section view showing the plant cultivation apparatus according to the embodiment of the present disclosure;

FIG. 7 is a sectioned-perspective view showing an internal structure of the plant cultivation apparatus according to the embodiment of the present disclosure;

FIG. 8 is a perspective view showing an internal structure of a machine chamber of the plant cultivation apparatus according to the embodiment of the present disclosure;

FIG. 9 is a plan view showing an internal structure of a machine chamber of the plant cultivation apparatus according to the embodiment of the present disclosure;

FIG. 10 is a perspective view showing a bed of the plant cultivation apparatus according to the embodiment of the present disclosure;

FIG. 11 is a perspective view from another angle, the view showing the bed of the plant cultivation apparatus according to the embodiment of the present disclosure;

FIG. 12 is a plan view showing the bed of the plant cultivation apparatus according to the embodiment of the present disclosure;

FIG. 13 is a cut-perspective view showing the bed of the plant cultivation apparatus according to the embodiment of the present disclosure;

FIG. 14 is a side section view showing the bed of the plant cultivation apparatus according to the embodiment of the present disclosure;

FIG. 15 is a cut-perspective view showing a coupled state between the bed, a bed cover, and a pod of the plant cultivation apparatus according to the embodiment of the present disclosure FIG. 16 is a main part section view from the front, the view showing an installation state of the bed of the plant cultivation apparatus according to the embodiment of the present disclosure;

FIG. 17 is an enlarged view showing part "A" in FIG. 7;

FIG. 18 is a perspective view showing a configuration of a lighting module of the plant cultivation apparatus according to the embodiment of the present disclosure;

FIG. 19 is a perspective view showing a state in which components constituting the lighting module showing in FIG. 18 are disassembled;

FIG. 20 is a perspective view showing a state in which a lighting module of another embodiment of the present disclosure is disassembled;

FIG. 23 is a perspective view from a direction opposite to a direction in FIG. 20, the view showing a configuration of the lighting module of the plant cultivation apparatus according to the embodiment of the present disclosure, where one lower cover is separated from the lighting module;

FIG. 24 is a section view showing the configuration of the lighting module of the plant cultivation apparatus according to the embodiment of the present disclosure;

FIG. 25 is an enlarged-section view showing a light source part shown in FIG. 24;

FIG. 26 is a plan view showing a lower configuration of the lighting module of the plant cultivation apparatus according to the embodiment of the present disclosure;

FIG. 27 is a plan view showing a position of a bed in a state of FIG. 26;

FIG. 28 is a plan view showing an embodiment of a light array constituting the lighting module of the present disclosure;

FIG. 29 is a plan view showing another embodiment of the light array constituting the lighting module of the present disclosure;

FIG. 30 is a concept view showing a state in which artificial light is emitted from the lighting module of the present disclosure;

FIG. 31 is an enlarge view of part "B" in FIG. 7, the view showing a circulation fan assembly of the plant cultivation apparatus according to the embodiment of the present disclosure;

FIG. 32 is a side view showing a state in which an opening and closing cover of a water supply module is opened in the plant cultivation apparatus according to the embodiment of the present disclosure;

FIG. 33 is a perspective view showing a state in which a water tank and an installation frame of the water supply module of the plant cultivation apparatus according to the embodiment of the present disclosure are coupled to each other;

FIG. 34 is a section view showing the state in which the water tank and the installation frame of the water supply module of the plant cultivation apparatus according to the embodiment of the present disclosure are coupled to each other;

FIG. 35 is a rear view showing the state in which the water tank and the installation frame of the water supply module of the plant cultivation apparatus according to the embodiment of the present disclosure are coupled to each other;

FIG. 36 is a plan view showing an air flow flowing into the machine chamber of the plant cultivation apparatus according to the embodiment of the present disclosure;

FIG. 37 is a plan view showing a state of supplying water to the inside of the bed of the plant cultivation apparatus according to the embodiment of the present disclosure; and FIG. 38 is a section view showing an air flow flowing from the machine chamber to a cultivation room of the plant cultivation apparatus according to the embodiment of the present disclosure.

MODE FOR THE INVENTION

Hereinbelow, an exemplary embodiment of a plant cultivation apparatus of the present disclosure will be described with reference to FIGS. 1 to 38.

Figure 1:
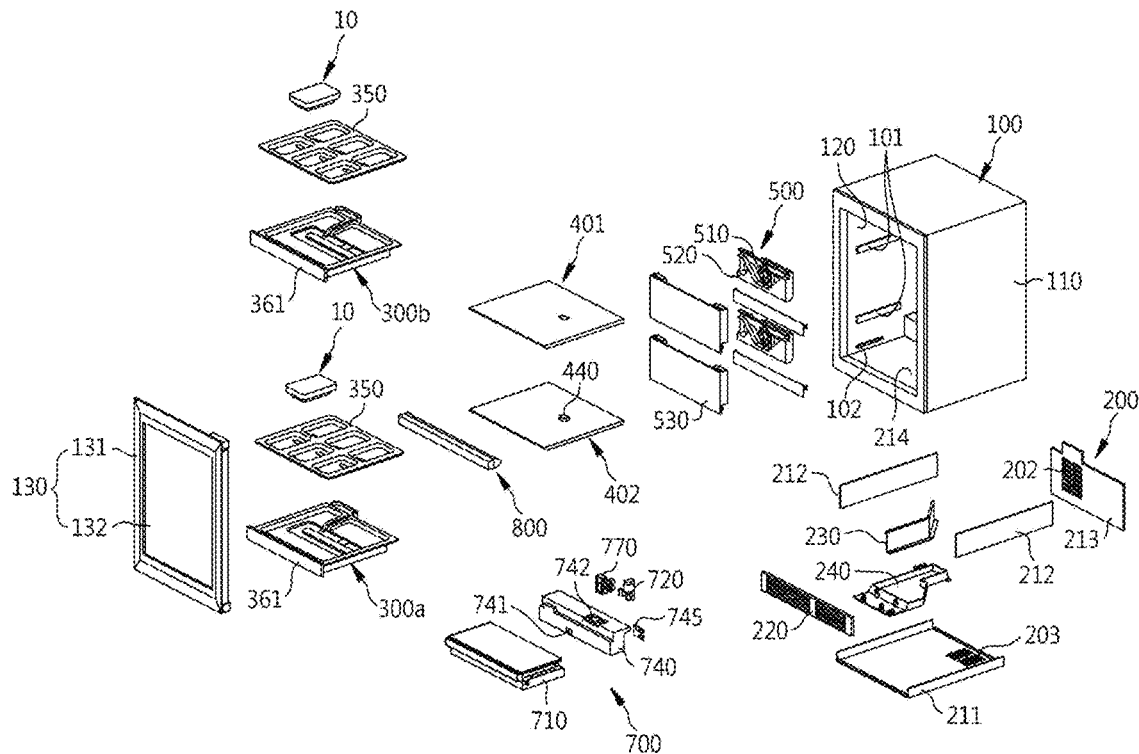
FIG. 1 is an exploded-perspective view showing a plant cultivation apparatus according to an embodiment of the present disclosure.
Figure 2:
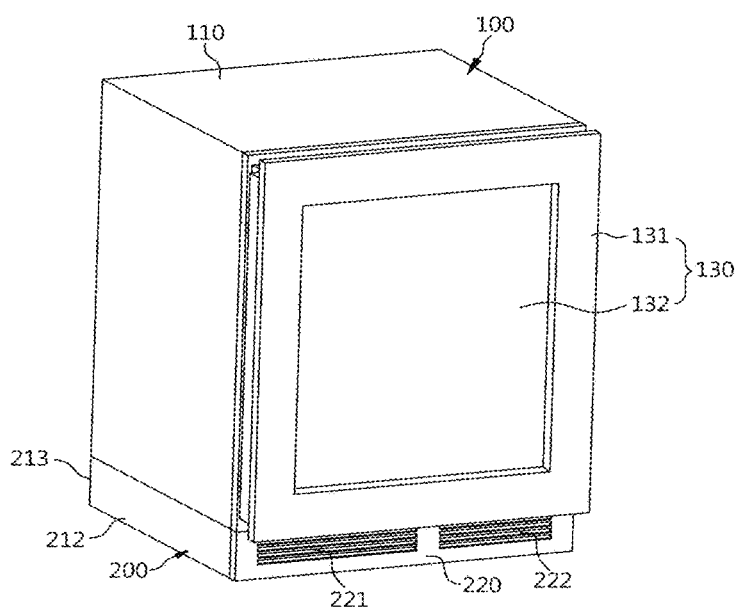
FIG. 2 is a perspective view showing the exterior of the plant cultivation apparatus according to the embodiment of the present disclosure, the plant cultivation apparatus in a state in which a door of the plant cultivation apparatus is closed.

FIG. 1 is an exploded-perspective view showing a plant cultivation apparatus according to an embodiment of the present disclosure. FIG. 2 is a perspective view showing the exterior of the plant cultivation apparatus according to the embodiment of the present disclosure, the plant cultivation apparatus in a state in which a door of the plant cultivation apparatus is closed. FIG. 3 is a perspective view showing the exterior of the plant cultivation apparatus according to the embodiment of the present disclosure, the plant cultivation apparatus in a state in which the door thereof is opened.

As shown in the drawings, a plant cultivation apparatus according to an embodiment of the present disclosure includes a cabinet 100, a machine chamber frame 200, beds 300a and 300b on which pods 10 are seated, lighting modules 401 and 402, a circulation fan assembly 500, an air conditioning module 600, and a water supply module 700. In particular, the pods 10 seated on each of the beds 300a and 300b are configured to include bed soil 11 containing a nutrient solution, so that supply water stored in the water supply module 700 is prevented from being deteriorated by the nutrient solution and the supply water is supplied to the bed 300a, 300b by a required amount of water to prevent the supply water from remaining in the bed 300a, 300b.

The plant cultivation apparatus will be described for each configuration in detail.

The pods 10 will be described with reference to FIGS. 4 and 5.

Each of the pod 10 is formed in an upward open container.

A bed soil 11 containing the nutrient solution (not shown) may be filled in the pod 10.

The nutrient solution is a material containing a nutrient that is supplied to plants to grow better. The nutrient solution may be provided in a water-soluble capsule form that gradually dissolves in water, so that the nutrient solution may be contained in the supply water while gradually dissolving every time when the supply water is supplied.

In addition, a seed paper 12 is provided on an upper surface of the bed soil 11. The seed paper 12 is a part where seeds are planted in a predetermined arrangement. When the supply water is supplied to the seed paper 12 seated on the upper surface of the bed soil 11, the seed paper 12 completely dissolves and the seeds remain on the bed soil 11.

A brick 13 is provided on an upper surface of the seed paper 12.

The brick 13 is configured to control moisture and humidity of soil and to prevent mold growth, and be formed by processing mineral ore such as vermiculite into a powder form and then compressing the powder.

An upper surface of the pod 10 is covered with a protection sheet 15, thereby protecting the inside thereof.

In particular, a packing member 14 is provided between an upper surface of the brick 13 and the protection sheet 15, so that the brick 13 is protected from the outside environment.

A type of a plant to be cultivated may be printed on a surface of the protection sheet 15.

Meanwhile, a protrusion 16 is formed downward on a lower surface of the pod 10 and the protrusion 16 is formed in a container body in which a water flow hole 16a may be provided at a lower surface thereof. The protrusion 16 may be formed in a hollow pipe structure that is open vertically and empty inside.

Further, a first absorber member 17 absorbing the supply water supplied to the bed 300a, 300b is provided in the protrusion 16, and a flat plate shaped second absorber member 18 is provided between the first absorber member 17 and the bed soil. The second absorber member 18 serves to uniformly supply the supply water absorbed by the first absorber member 17 to the entire portion of the bed soil 11.

Next, the cabinet 100 will be described with reference to FIGS. 1 to 3.

The cabinet 100 is a part that provides the exterior of the plant cultivation apparatus.

The cabinet 100 is formed in a container body that is open forward, and include an outer casing 110 providing an outer wall surface thereof and an inner casing 120 providing an inner wall surface.

Herein, the outer casing 110 is formed in a container body that is closed at an upper surface thereof and open at a lower surface and a front surface thereof.

The inner casing 120 is positioned in the outer casing 110 while being spaced apart from the outer casing 110. A foam insulation (not shown) may be filled between the inner casing 120 and the outer casing 110.

A cultivation room 121, 122 is provided in the inner casing 120. The cultivation room 121, 122 is a place where the plants are grown.

The cultivation room 121, 122 includes the lower first cultivation room 121 and an upper second cultivation room 122, and each of the two cultivation rooms 121 and 122 is configured to have a separate space.

The inner casing 120 is configured to have a bottom 123. The bottom 123 of the inner casing 120 is configured as a bottom of the cultivation room 121, 122 of the cabinet 100.

The cabinet 100 has a door 130 at a front surface thereof.

The door 130 is configured to open and close the cultivation room 121, 122 of the cabinet 100.

That is, as the door 130 is provided in the cabinet 100, the plant cultivation apparatus according to the embodiment of the present disclosure is a closed-type cultivation apparatus. In particular, in the case of the closed-type cultivation apparatus, the plant cultivation apparatus may cultivate the plant while providing a sufficient amount of light and maintaining a predetermined temperature therein by the lighting modules 401 and 402, the circulation fan assembly 500, and the air conditioning module 600, which will be described below.

Meanwhile, the door 130 may be one of a rotary type opening and closing structure and a sliding type opening and closing structure, and may be configured to block the front surface of the cabinet 100.

In the embodiment of the present disclosure, the door 130 is configured as the rotary type opening and closing structure.

The door 130 may include a door frame 131 having a rectangular frame structure with an empty inside portion and a sight glass 132 blocking the empty inside portion of the door frame 131.

Preferably, the sight glass 132 may be formed of a transparent material, for example, may be formed of glass.

When the sight glass 132 is formed of glass, a protecting film (not shown) may be attached on the glass. The protecting film may be a light shading film (partially shading) that minimizes the leakage of light from the cultivation room indoors.

Instead of the protecting film, the sight glass 132 may have a dark color, so that the leakage of light indoors may be minimized.

Further, although not shown in the drawings, the door 130 may be configured of only the sight glass 132 without the door frame 131, and may have a structure in which the door 130 is configured with a structure around the sight glass 132.

Next, the machine chamber frame 200 will be described with reference to FIGS. 1, and 6 to 9.

The machine chamber frame 200 constitutes a bottom portion of the plant cultivation apparatus according to the embodiment of the present disclosure.

As shown in FIG. 1, the machine chamber frame 200 is extended from a lower portion of the outer casing 110. The machine chamber frame 200 includes a bottom plate 211 constituting a bottom of the machine chamber frame 200, side surface plates 212 constituting opposite side surfaces thereof, a rear surface plate 213 constituting a rear surface thereof, and an upper surface plate 214 constituting an upper surface thereof. That is, the machine chamber frame 200 is formed in a box shaped structure that has an open front surface.

The machine chamber frame 200 is configured such that the open lower surface of the outer casing 110 is placed thereon and is coupled thereto.

The machine chamber frame 200 and the inner casing 120 is disposed to be spaced apart from each other and the side surface plates 212 and the rear surface plate 213 of the machine chamber frame 200 are respectively configured to be connected to opposite side surfaces and a rear surface of the outer casing 110.

Further, the inside of the machine chamber frame 200 is configured as a machine chamber 201 (referring to FIG. 6).

That is, the machine chamber 201 and the cultivation room 121, 122 are provided in a space in the machine chamber frame 200 and a space in the inner casing 120, respectively, and the machine chamber 201 and the cultivation room 121, 122 function separately from each other.

A part of components of the air conditioning module 600, which will be described below, is provided in the machine chamber 201.

Although not shown in the drawings, the inner casing 120 and the machine chamber frame 200 may be formed in a singly body. In this case, a separate partition may be provided between the cultivation room 121, 122 and the machine chamber 201, so that the cultivation room 121, 122 and the machine chamber 201 may be separated from each other.

Further, an intake and exhaust grill 220 is provided on the open front surface of the machine chamber frame 200 that is the front of the machine chamber 201. That is, the intake and exhaust grill 220 serves to guide air flow suctioned from the indoor into the machine chamber 201 or air flow discharged from the machine chamber 201 to the indoor, and serves to block an open front surface of the machine chamber 201.

In addition, the intake and exhaust grill 220 has an inlet 221 and an outlet 222. The inlet 221 and the outlet 222 are separated from each other by being arranged at positions divided by a partition 230, which will be described below. In the embodiment of the present disclosure, the inlet 221 and the outlet 222 are defined as the inlet 221 at the left and the outlet 222 at the right, when viewed from the front of the plant cultivation apparatus. The above configuration is as shown in FIGS. 2 and 3.

Further, the partition 230 dividing the inside of the machine chamber 201 into left and right sides is provided in the machine chamber frame 200. That is, flow paths through which air flows into and is discharged from the machine chamber 201 are divided by the partition 230.

The inlet 221 of the intake and exhaust grill 220 is positioned in a flow path through which air flows into the machine chamber 201, and the outlet 222 thereof is positioned in a flow path through which air is discharged from the machine chamber 201.

In addition, the opposite sides in the machine chamber 201 which are divided by the partition 230 are configured to communicate with each other at a rear portion of the machine chamber 201. That is, a rear end portion of the partition 230 is spaced apart from a rear wall surface in the machine chamber 201 without contacting therewith, so that the opposite divided sides communicate with each other.

Although not shown in the drawings, an open hole (not shown) may be provided in the rear end portion of the partition 230 to allow the opposite sides in the machine chamber 201 to communicate with each other.

Further, the partition 230 may be formed in a straight line shape, and may be formed in an inclined structure or a bent structure. In the embodiment of the present disclosure, the partition 230 is formed in the bent structure. That is, the partition 230 is partially bent, so that a condenser 620, which will be described later, may be formed as large as possible.

Further, a condensed water reservoir 240 is provided in the machine chamber 201 of the machine chamber frame 200. The condensed water reservoir 240 that is described above is positioned at a bottom at the side where air flows into the machine chamber 201 through the inlet 221, and serves to receive condensed water flowing down from the condenser 620 and to fix the condenser 620 in the machine chamber 200.

Further, a heat exhaust opening 202 is formed by penetrating the rear surface plate 213 of the machine chamber frame 200. The heat exhaust opening 202 is a hole provided to discharge (or suction) air dissipating heat of a compressor 610, which will be described below. That is, through additional provision of the heat exhaust opening 202, the discharge of air is smoothly performed.

The bottom plate 211 of the machine chamber frame 200 may have a discharge hole 203 that is provided to discharge the air dissipating heat of the compressor 610.

Meanwhile, a rear portion of the upper surface plate 214 providing the upper surface of the machine chamber frame 200 protrudes upward more than other portions thereof, so that the rear portion of the inside of the machine chamber 201 is higher than other portions thereof. That is, considering a protruding height of the compressor 610 provided in the machine chamber 201, the rear portion of the machine chamber 201 is formed higher than the other portions thereof.

Further, a controller 20 (referring to FIG. 6) is provided at the front of a portion between an upper surface of the upper surface plate 214 and a lower surface of the inner casing 120, the lower surface thereof facing the upper surface of the upper surface plate 214, the controller 20 being provided to control operation of each component of the plant cultivation apparatus. A circuit board having various control circuits constitutes the controller 20.

Next, the bed 300a, 300b will be described with reference to FIGS. 10 to 17.

The bed 300a, 300b is a part provided to place the pod 10 thereon, so that the plant is cultivated in the pod 10.

The bed 300a, 300b is provided in the cultivation room 121, 122 of the cabinet 100.

In particular, first guide rails (referring FIGS. 1 and 16) are respectively provided on opposite wall surfaces (opposite wall surfaces in the inner casing) in the cultivation room 121, 122. The first guide rails 101 guide the bed 300a, 300b to be moved back and forth so that the bed 300a, 300b may be ejected from the cultivation room 121, 122 in a drawer manner.

Guide ends 301 are provided on opposite wall surfaces of the bed 300a, 300b. The guide ends 301 are configured to be supported by the first guide rails 101, so that the bed 300a, 300b is ejected from the cultivation room 121, 122 in the drawer manner. Although not shown in the drawings, the bed 300a, 300b is configured to be ejected in the drawer manner by other various structures.

Further, a water reservoir 310 is provided at a rear surface of the bed 300a, 300b. The water reservoir 310 is configured to receive the supply water from the outside of the bed 300a, 300b and supply the supply water into the bed 300a, 300b.

The water reservoir 310 is formed by protruding rearward from any one side portion of the rear surface of the bed 300a, 300b. In addition, the water reservoir 310 has a bottom surface formed in a downward concave shape and is configured to guide the supply water to flow into a communication portion with a water supply flow path 330, which will be described below.

In addition, a water supply groove 320 depressed from a bottom of the bed 300a, 300b is formed at a center portion in the bed 300a, 300b. The water supply flow path 330 is configured to guide the supply water supplied into the water reservoir 310 to be supplied into the water supply groove 320.

Herein, the water supply flow path 330 is formed in a groove reaching from the water reservoir 310 to the water supply groove 320. Although not shown in the drawings, the water supply flow path 330 is configured of a pipe or a hose that is separated from the bed 300a, 300b.

In particular, the water supply flow path 330 may be configured as an inclined structure or a round structure that is gradually (or sequentially) inclined downward as the water supply flow path 330 goes from the water reservoir 310 to the water supply groove 320. That is, the above-described inclined or round structure may allow the supply water to be rapidly supplied and prevent the supply water supplied into the water supply groove 320 from overflowing to the water reservoir 310.

In addition, on opposite sides of the water supply flow path 330, bank parts 331 provided to precisely guide the supply water are provided. That is, the bank parts 331 are configured to allow the supply water supplied along the water supply flow path 330 to be smoothly supplied to the water supply groove 320 without overflowing the water supply flow path 330.

Further, at a center portion on the water supply groove 320, a dam part 340 is formed by protruding upward on a surface of the water supply groove 320. The dam part 340 is formed in a long protrusion that is long in a left and right direction of the bed 300a, 300b. Based on the dam part 340, the water supply groove 320 is divided into a front water supply groove 321 and a rear water supply groove 322.

That is, when a plurality of pods 10 is respectively seated in rows of front and rear portions of the bed 300a, 300b, front row pods 10 are arranged such that the protrusion 16 of each of the front row pods is positioned rearward and is in contact with the front water supply groove 321, and rear row pods 10 are arranged such that the protrusion 16 of each of the rear row pods is positioned forward and is in contact with the rear water supply groove 322.

In particular, the dam part 340 is formed by protruding upward from a bottom of the water supply groove 320, thus the supply water does not remain therein, and the dam part 340 serves to guide the supply water to be precisely supplied to a portion where the protrusion 16 of the pod 10 is positioned.

Further, on the bottom surface of the water supply groove 320, a flow guidance groove 302 is provided in a portion of communicating with the second water supply flow path 330.

That is, the supply water flowing along the second water supply flow path 330 is guided by the flow guidance groove 302 in the process of flowing into the water supply groove 320 to flow from one side of the water supply groove 320 to another side thereof.

In addition, a sensing protrusion 323 is formed by protruding on the bottom surface of the water supply groove 320. An upper surface of the sensing protrusion 323 is positioned higher than the bottom surface in the water supply groove 320 and positioned lower than the bottom surface of the bed 300a, 300b.

A plurality of beds 300a and 300b may be provided. In this case, the beds 300a and 300b may be vertically spaced apart from each other in the cultivation room 121, 122.

A vertical distance between the beds 300a and 300b may be set differently depending on the sizes in the cultivation rooms 121 and 122 or the type of plant to be cultivated. For example, as the first guide rails 101 provided on the opposite wall surfaces in the cultivation room 121, 122 are configured to be adjusted in vertical position, the vertical distance between the beds 300a and 300b may be adjusted as needed.

Further, the bed 300a, 300b has a bed cover 350.

The bed cover 350 is a part on which each pod 10 is seated to be positioned at its original position. A plurality of seating grooves 351 and 352 provided for seating of each pod 10 is formed on an upper surface of the bed cover 350.

Each of the seating grooves 351 and 352 has a width roughly equal to a width of the pod 10 and be formed by being depressed at a depth sufficient to partially receive the pod 10. The bed cover 350 is formed of a metal material and, in particular, it is preferable that the bed cover 350 is formed of stainless steel to prevent corrosion. The bed 300a, 300b is formed of acrylonitrile, butadiene, and styrene (ABS) resin.

In addition, a penetration hole 351a, 352a is provided in each of the seating grooves 351 and 352 so that the protrusion 16 of the pod 10 penetrates the penetration hole 351a, 352a. That is, the user can place the pod 10 in its original position by checking a position of the penetration hole 351a, 352a and a position of the protrusion 16.

In particular, the seating grooves 351 and 352 is divided into a front row seating groove 351 on which each of the front row pods 10 is seated and a rear row seating groove 352 on which each of the rear row pods 10 is seated. A penetration hole 351a of the front row seating groove 351 and a penetration hole 352a of the rear row seating groove 352 is arranged adjacent to each other. That is, when the bed cover 350 is seated on the bed 300a, 300b, the penetration holes 351a and 352a are respectively positioned at the front water supply groove 321 and the rear water supply groove 322 of the bed 300a, 300b.

Further, a handle 361 may be provided in a front surface of the bed 300a, 300b. The user can eject or retract the bed 300a, 300b in the drawer manner by using the handle 361.

A front surface of the handle 361 is configured not to be in contact with an inside surface of the door 130, thus a gap is provided between the front surface of the handle 361 and the door 130. That is, through the gap, air may flow between the upper cultivation room 121 and the lower cultivation room 122, and air flowing in a lower cultivation room 122 may be discharged indoors.

Through the flow of air through the gap described above, condensation is prevented from forming on surface of the door 130.

Next, the lighting module 401, 402 will be described with reference to FIGS. 18 to 30.

The lighting modules 401 and 402 serve to emit artificial light to the pods 10 seated on the beds 300a and 300b in the cultivation rooms 121 and 122. The lighting modules 401 and 402 supply artificial light to plants in the closed plant cultivation apparatus to allow the plants to grow. The lighting modules 401 and 402 are respectively provided above the beds 300a and 300b, and emit artificial light downward, that is, toward the beds 300a and 300b.

In the embodiment, the lighting modules 401 and 402 may include a first lighting module 401 provided in the first cultivation room 121, and a second lighting module 402 provided in the second cultivation room 122. Since the cultivation rooms 121 and 122 are configured as two cultivation rooms, the lighting modules 401 and 402 are configured as two lighting modules in order to respectively supply artificial light to the two cultivation rooms. The first lighting module 401 and the second lighting module 402 are respectively provided at upper portions of the first cultivation rooms 121 and the second cultivation rooms 121. In the embodiment, the first lighting module 401 and the second lighting module 402 have the same structure, so that the first lighting module 401 and the second lighting module 402 will be described below together.

In the embodiment, the lighting modules 401 and 402 are removably provided in the inner case 120. Each of the lighting modules 401 and 402 may be configured of a plurality of components, and the lighting module 401, 402 in a state of assembling the components may be assembled in the inner case 120, in more detail, in an upper portion in the cultivation room 121, 122. Accordingly, the lighting module 401, 402 may be separated from the cultivation room 121, 122 for maintenance of the lighting module 401, 402.

As shown in FIG. 18, the lighting module 401, 402 in the completely assembled state may be assembled to the inner case 120 while being configured as a separate apparatus. The lighting module 401, 402 is an approximately thin hexahedron structure, and a light source part 430, a wire harness provided to supply power to the light source part 430, etc., which will be described below, are provided in the lighting module 401, 402.

As a configuration of the lighting module 401, 402, the lighting module 401, 402 includes a lighting case 410, the light source part 430, and a lighting cover 470 coupled to the lighting case 410 to cover one side of the light source part 430. The lighting case 410 provides a frame of the lighting module 401, 402, and has an approximately flat plate shape as shown in FIG. 19.

A structure of the lighting case 410 will be described below in detail with reference to FIG. 21. The lighting case 410 has a rectangular plate shape, a light installation part 420 is provided in an upper surface 411a of the lighting case 410, and a partitioning end 411 is provided along an edge of the lighting case 410. Herein, the upper surface 411a refers to a surface of the lighting case 410 facing an upper cover 460. The partitioning end 411 is a portion protruding from the edge of the upper surface 411a of the lighting case 410, and is formed in a shape surrounding the light installation part 420. For reference, in FIG. 21, reference numerals F and R are marked to distinguish the direction in which the lighting case 410 is installed, F indicates the front, that is, a side of the door 130 of the plant cultivation apparatus, and R indicates the rear, that is, a side of the circulation fan assembly 500.

A drainage guide 412 is provided in the upper surface 411a of the lighting case 410. The drainage guide 412 is extended in a long shape along one end of the lighting case 410, and formed in an inclined direction. The drainage guide 412 is formed in the lighting case 410 along an inside edge thereof positioned at the inside of the cultivation room 121, 122 in the downward inclined direction. As shown in FIG. 18, the drainage guide 412 is provided in the upper surface 411a of the lighting case 410, and exposed outward while being not covered by the upper cover 460.

The drainage guide 412 is a drainage structure, and allows moisture falling from an upper portion of the lighting module 401, 402 to be naturally discharged rearward. In order to achieve the function, a drain hole 412' is provided in an open state in a center portion of the drainage guide 412. That is, fluid flowing down the drainage guide 412 flows downward along the inclination of the drainage guide 412 and then is discharged through the drain hole 412'.

In the embodiment, the drainage guide 412 is positioned at a position corresponding to a lower side of an evaporator 630. Whereby, when water generated from the evaporator 630 falls down, the water falls to the drainage guide 412 and moves downward through the drain hole 412'. The water discharged through the drain hole 412' may be transferred to the condensed water reservoir 240 described above. As described above, even when moisture is generated inside the cultivation room 121, 122, including water generated from the evaporator 630, and falls to the lighting modules 401 and 402, the water may be discharged outward without remaining in the lighting module 401, 402.

Figure 21:
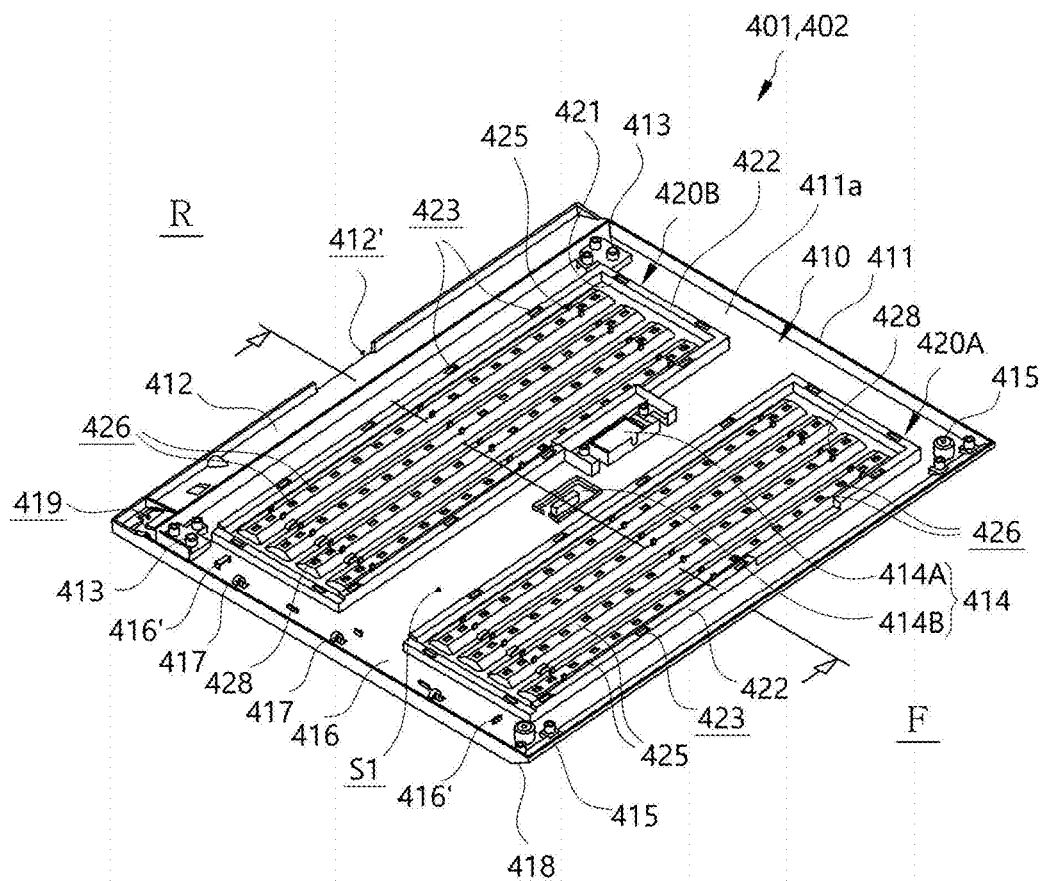
FIG. 21 is a perspective view showing a configuration of a lighting case constituting the lighting module of the plant cultivation apparatus according to the embodiment of the present disclosure.

As shown in FIG. 21, the upper surface 411a of the lighting case 410 has a fan installation part 413 in which a shroud 520 to be described below is provided. The fan installation part 413 is provided in opposite sides of the upper surface 411a of the lighting case 410, and has a structure of protruding upward and having a hole at the center thereof. In the embodiment, the first lighting module 401 of the lighting modules 401 and 402 is configured such as a rear end thereof is fixed to the shroud 520 of the circulation fan assembly 500 to be described below, that is, to a portion where the fan installation part 413 is assembled with the shroud 520. The fan installation part 413 may be omitted or have a difference shape in response to a position or an assembly structure of the circulation fan assembly 500.

Sensors are provided in the lighting case 410. It is necessary to maintain proper environment conditions of the cultivation rooms 121 and 122 for growth of plants, and the sensors are provided for detecting the environment conditions. In the embodiment, the sensors are provided in the lighting case 410 and detect the environment conditions of the cultivation rooms 121 and 122. The lighting modules 401 and 402 are not only provided in parallel with the beds 300a and 300b of the cultivation rooms 121 and 122, but also exposed to the cultivation rooms 121 and 122. Thus, the sensors are provided in the lighting case 410 because the sensors are advantageous for detecting the environment conditions of the cultivation rooms 121 and 122.

In detail, a second residual detection sensor 440 and the temperature sensor (not shown) are provided in the lighting case 410 of the second lighting module 402. The second residual water detection sensor 440 may be positioned inside the sensing protrusion 323, in the lower portion of the second bed 300b. The second residual water detection sensor 440 may detect whether or not the residual water remains on the upper surface of the sensing protrusion 323 to determine the residual water in the water supply groove 320.

The second residual water detection sensor 440 may be configured of a capacitance-type sensor and accurately detect the residual water in the water supply groove 320. The second residual water detection sensor 440 may also be configured in other methods not shown in the drawings. For example, the second residual water detection sensor 440 may be configured as a mechanical sensor such as a floating method or an electronic sensor using two electrodes.

That is, the second residual detection sensor 440 is provided for detecting residual water in the second bed 300b of the beds 300a and 300b. As described below, a first residual water detection sensor 742 that detects residual water in the water supply groove 320 of the first bed 300a is provided in an upper surface of an installation frame 740, so the first residual water detection sensor 742 is unnecessarily provided in the lighting case 410 of the lighting module 401, 402.

The second residual detection sensor 440 may be provided an upper surface of an upper surface of the second lighting module 402. That is, by forming the first lighting module 401 and the second lighting module 402 equally, it is possible to use the lighting modules 401 and 402 in common. The second lighting module 402 may be configured to have a portion to which the second residual detection sensor 440 is coupled and may be configured such that the second residual detection sensor 440 is not directly mounted thereto.

As shown in FIG. 21, a sensor installation part 414 is provided in the lighting case 410. The sensor installation part 414 is provided for installation of the sensors, and in the embodiment, the sensor installation part 414 includes a first sensor installation part 414A where the second residual detection sensor 440 is provided and a second sensor installation part 414B where the temperature sensor is provided. The second residual detection sensor 440 may be provided in the first sensor installation part 414A by using a separate mounting device, and the second residual detection sensor 440 may be provided to protrude toward the second bed 300b positioned in an upper portion of the lighting case 410.

The temperature sensor is provided in the second sensor installation part 414B, and the temperature sensor is provided to detect the temperature in the cultivation room 121, 122. The temperature sensor is exposed toward the cultivation room 121, 122 and detects the temperature in the cultivation room 121, 122. For example, the temperature sensor 450 (referring to FIG. 23) may serve to detect the temperature in the cultivation room 121, 122 to allow the air conditioning module 600 to control the temperature of air.

The second sensor installation part 414B is provided in the center of the lighting case 410, so that the temperature in the cultivation room 121, 122 may be accurately measured. That is, the temperature sensor provided in the second sensor installation part 414B measures the temperature of the center of the cultivation room 121, 122 without being biased to one side of the cultivation room 121, 122, and thus may accurately measure the temperature in the cultivation room 121, 122. In the embodiment, the first sensor installation part 414A and the second sensor installation part 414B are provided in a non-lighting section S1, which will be described below.

An installation boss 415 protrudes from the lighting case 410, and the installation boss 415 may allow the lighting case 410 to be fastened to the inside of the cabinet 100. A pair of installation bosses 415 is provided in opposite sides of a front portion of the lighting case 410, and each of the installation boss 415 has a fastening hole 415' formed by penetrating the installation boss 415 to allow a fastening device to be inserted therein.

The lighting case 410 has a wire guide part 416. The wire guide part 416 is a kind of path that is extended along the upper surface 411a of the lighting case 410, and the wire harness (not shown) is seated on the wire guide part 416. The wire harness may include a wire provided to supply power to the light source part 430, a wire connected to the temperature sensor, and a wire connected to the second residual detection sensor 440.

The wire guide part 416 is formed along an edge of the upper surface 411a of the lighting case 410. In the embodiment, the wire guide part 416 is provided in one side of the light installation part 420 while being spaced apart therefrom. The wire guide part 416 has a protrusion guide 416' provided to guide an installation position of the wire harness, and a hook 417 provided to fix the wire harness that is seated on the wire guide part 416. A plurality of hooks 417 and a plurality of protrusion guides 416' may be provided along the wire guide part 416.

The lighting case 410 has an interference avoidance surface 418. The interference avoidance surface 418 is formed in an inclined direction at a front surface of the lighting case 410, and may prevent interference with a display module 800, which will be described below, through the inclination structure of the interference avoidance surface 418. The interference avoidance surface 418 may be provided in the entire front surface of the lighting case 410 or may be formed in a part of the front surface thereof.

Referring FIG. 23, an uneven surface 418' is provided in a portion of a lower surface of the lighting case 410, the portion being adjacent to the interference avoidance surface 418. The fastening hole 415' of the installation boss 415 is exposed through the uneven surface 418'. The uneven surface 418' serves to improve the aesthetic sense by making the fastening hole 415' invisible to the naked eye.

The lighting case 410 has a wire through hole 419. The wire through hole 419 is a through portion for the wire harness to pass therethrough, and a pair of wire through holes 419 is provided in opposite sides of a rear portion of the lighting case 410. For the wire harness to naturally pass through the wire through hole 419, the wire through hole 419 is provided in the wire guide part 416 or is provided in a position adjacent to the wire guide part 416. In FIG. 23, a depressed installation part 419' is provided in a position adjacent to the wire through hole 419. The depressed installation part 419' is a portion corresponding to the opposite side to the fan installation part 413 and is assembled with the shroud 520.

The light source part 430 is provided in the lighting case 410. The light source part 430 is configured to receive power to generate artificial light. In the embodiment, the light source part 430 has a plurality of light sources 433 (referring to FIG. 24). The light sources 433 are LED, and a plurality of LED light sources 433 is provided in the lighting case 410 while constituting the light source part 430. The light source part 430 increases illuminance of the cultivation room 121, 122 to allow the plants to grow. The light source part 430 serves to provide high illuminance and to uniformly emit artificial light to each plant, and the structure thereof will be described again below.

The light source part 430 may be configured as a plurality of light source parts 430 that are separated from each other. In the embodiment, the light source part 430 includes a first light source part 430A and a second light source part 430B. The first light source part 430A and the second light source part 430B are spaced apart from each other and provided in the lighting case 410. As described above, separation between the first light source part 430A and the second light source part 430B relates to arrangement of the pods 10 positioned below the light source parts.

More precisely, in the bed 300a, 300b provided below the light source part 430, the front row seating groove 351 on which the front row pods 10 are seated and the rear row seating groove 352 on which the rear row pods 10 are seated are provided. Since the front row seating groove 351 and the rear row seating groove 352 are spaced apart from each other, the first light source part 430A and the second light source part 430B are spaced apart from each other in response to separation between the front row seating groove 351 and the rear row seating groove 352. The light source part 430 may be configured as one light source part in response to configuration of the bed 300a, 300b or as three light source parts or more.

The light source part 430 includes a circuit board and the light sources 433 provided in the circuit board. The plurality of light sources 433 constitutes a light array 431 (referring to FIG. 28) that is arranged in one direction, and a plurality of light arrays 431 is arranged in the lighting case 410 with having intervals from each other. The plurality of light arrays 431 constitutes one light source group. In the embodiment, the light source group include a first light source group and the second light source group. The first light source part 430A may be the first light source group, and the second light source part 430B may be the second light source group.

The circuit board may be configured as one circuit board for each light source group, or for each light array 431. First, as shown in FIG. 19, the first light source part 430A (the first light source group) includes four circuit boards, and the second light source part 430B (the second light source group) includes four circuit boards. That is, one circuit board is provided for each light array 431. A hub substrate 437 is arranged in a direction of crossing eight circuit boards constituting the first light source part 430A and the second light source part 430B. The hub substrate 437 is electrically connected to each circuit board, and may be connected thereto by being assembled using a connector or by using a wire. A connection head 438 that is connected to an end portion 435 of each circuit board is arranged in the hub substrate 437.

In contrast, FIG. 20 is a view showing an embodiment in which one circuit board is provided for each light source group. Two circuit boards respectively constitute the first light source part 430A (the first light source group) and the second light source part 430B (the second light source group), and the plurality of light arrays 431 is arranged in each light source part. Unlike the embodiment shown in FIG. 19, the hub substrate 437 may be omitted, and a wire branched from the wire harness may be directly connected to the circuit board.

The light source group is spaced apart from another adjacent light source group and forms the non-lighting section S1 between the adjacent light source group. As shown in FIG. 21, the non-lighting section S1 exists between a first light source installation part 420A where the first light source part 430A is provided and a second light source installation part 420B where the second light source part 430B is provided, and the non-lighting section S1 may refer to a portion where the light sources 433 are not provided. The non-lighting section S1 is extended while crossing between the first light source installation part 420A and the second light source installation part 420B. The non-lighting section S1 is positioned in a portion corresponding to a space between pod groups configured of the plurality of pods 10 that is arranged below the lighting module 401, 402.

The first light source installation part 420A and the second light source installation part 420B are covered by the upper cover 460 so that the light source part 430 is sealed. The upper surface 411a of the lighting case 410 has a partition fence 422 that protrudes while surrounding the light installation part 420, and an upper surface of the partition fence 422 is in close contact with the upper cover 460. Accordingly, when the upper cover 460 is assembled to the lighting case 410, the light installation part 420 may be prevented from entering of foreign matter or moisture. The partition fence 422 has an approximately rectangular shape, and protrudes while surrounding the light installation part 420, light source guides 425 to be described below are provided in the inside of a relatively depressed installation space 421.

The partition fence 422 has cover fastening holes 423. The cover fastening holes 423 are provided to be fastened with the lighting cover 470 that is assembled to the lower surface of the lighting case 410, that is, to a surface opposite to the light installation part 420 to which the upper cover 460 is assembled. More precisely, as shown in FIG. 17, an assembly end 472 of the lighting cover 470 is inserted into a cover assembly groove 422' that is formed by depressing a surface at the side opposite to the partition fence 422. Then, assembly protrusions 475 (referring to FIG. 19) corresponding to the cover fastening holes 423 are provided in the assembly end 472 of the lighting cover 470. In contrast, a protrusion structure may be provided inside the cover fastening holes 423, and a groove structure corresponding to the protrusion structure may be provided in the assembly end 472. Accordingly, when the assembly end 472 of the lighting cover 470 is inserted into the cover assembly groove 422' of the depressed structure, as contact area is widened, it is possible to more reliably prevent foreign matter or moisture from entering.

The light installation part 420 has a plurality of light source guides 425. In the embodiment, each of the first light source installation part 420A and the second light source installation part 420B has four light source guides 425A to 425D (referring to FIG. 26). Each of the light source guides 425 is arranged in one direction, and has a structure in which a center portion thereof relatively protrudes upwards, that is, protrudes in a direction of the upper cover 460. The respective light source part 430 is seated on the light source guides 425, and the number of the light source guides 425 is the same as the number of the light array 431. That is, the light arrays 431 are respectively seated thereon.

Figure 22:
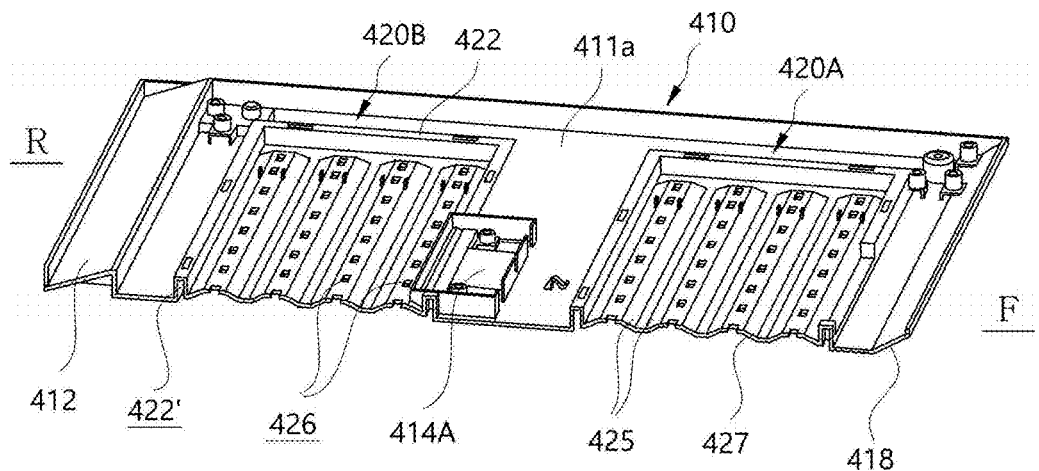
FIG. 22 is a section view showing a configuration of the lighting case constituting the lighting module of the plant cultivation apparatus according to the embodiment of the present disclosure.

As shown in FIG. 22, each of the light source guides 425 has a shape in which a center portion is relatively high and to be gradually lowered toward both sides. The light source guide 425 has light source holes 426 penetrating the center portion thereof. In the light source holes 426, each light source 433 constituting the light array 431, that is, light sources are arranged therein to emit artificial light downward.

In addition, in an edge of the light source hole 426, the light source guide 425 is formed to be inclined direction and having a guide inclination surface 427. In the second embodiment, as shown in FIG. 24, the guide inclination surface 427 is extended symmetrically in opposite directions on the basis of the light source holes 426. Accordingly, the light source guide 425 is extended to be inclined in a direction away from the lighting cover 470 as the light source guide 425 goes toward the light source holes 426. Then, a hook 428 protrudes from an upper surface of the light source guide 425, and a pair of hooks 428 is provided to fix the circuit board constituting the light source part 430.

As shown in FIG. 25, the light source guide 425 is extended at a wider angle than a light emitting angle of the light source 433. More precisely, an angle A2 between an imaginary vertical line L1 and an imaginary line L3 extended from the guide inclination surface 427 is larger than an angle A1 between the imaginary vertical line L1 and an imaginary line L2 representing a range of light emitted from the light source 433 (A2>A1). Light emitted from the light source 433 may not interfere with the light source guides 425 through the angle difference, and light reflected from the surrounding structure including the lighting cover 470 may be reflected back to the guide inclination surface 427 and transmitted downward, that is, toward the pods 10.

Further, through the inclination of the light source guide 425, artificial light emitted from the light source 433 may be focused on the bed 300a, 300b without being distributed to the periphery, for example, to a side surface or an upper surface of the cultivation room 121, 122. In particular, due to the inclination of the light source guide 425, the light source 433 is positioned to be biased toward the upper cover 460, and light is prevented from being emitted toward the side surface of the cultivation room 121, 122. In order to increase the reflectance of light, the lighting case 410 including the light source guide 425 may be painted white, or a separate coating or surface processing may be added to the lighting case 410.

The light sources 433 constituting the light source part 430 may not be arranged at regular intervals from each other, but may be arranged at different intervals. For example, among the light sources 433, light sources 433 emitting light toward the center of the bed 300a, 300b may be arranged at a relatively wider interval than intervals of other adjacent light sources 433 arranged on the periphery.

FIG. 26 is a view showing a structure of the light installation part 420, and the structure the arrangement of the light sources 433 to be known. As shown in FIG. 26, among the plurality of the light sources 433 provided in one light array 431, an interval between the light source 433 arranged in a center portion of the light array 431 and an adjacent light source 433 is relatively wider than an interval between the light sources 433 arranged at both sides of the center.

In the center portion of the light array 431, the light sources 433 arranged at the center portion thereof are spaced apart from each other to provide a light source separation part S2 in the space. The light source separation part S2 is a void in which the light sources 433 are omitted like the above-described non-lighting section S1. The light array 431 includes the plurality of the light sources 433 and light emitted from the adjacent light sources 433 to overlap. Since the center portion has the greatest number of light sources 433 and lights overlap each other in the center portion, the light sources 433 are arranged at the wider interval.

In a seating groove 351, 352 of the bed 300a, 300b provided in a lower portion of the lighting module 401, 402, a seating groove 351B, 352B positioned at the center of the bed is positioned below the light source separation part S2. In FIG. 27, the seating grooves 351 and 352 of the bed cover 350 on which the pods 10 are seated are marked with dotted lines. As shown in FIG. 27, the seating grooves 351B and 352B positioned at the center are positioned at positions corresponding to the light source separation part S2. In other words, the pod 10 is positioned at the center portion of the light array 431 where light of the light source part 430 is focused, and based on the center pod 10, the other pods 10 are arranged to be symmetrical toward both sides.

In the embodiment, among the seating grooves 351 and 352 provided below the lighting module 401, 402, seating grooves 351A, 351B, 352A, and 352B that are arranged at outermost positions are arranged to protrude more outward than the light source part 430. The arrangement is to consider the angle at which light is emitted from the light source 433, and to increase the space utilization rate in the cultivation room 121, 122. In contrast, among the seating grooves 351 and 352, the outermost seating grooves 351A, 351B, 352A, and 352B may have the same length as the length of the light source part 430 or may be arranged at positions inside the light source part 430.

The arrangement of the light sources 433 is shown in detail in FIGS. 28 to 30. In FIG. 28, among the plurality of the light sources 433 provided in the light array 431, the light sources 433 positioned at the center portion has the wide interval to provide an empty section 432 therein. Empty sections 432 of each light array 431 are gathered to provide the light source separation part S2.

Meanwhile, light sources 4337 and 4338 arranged in an edge of the light array 431 may be arranged at a relatively narrower interval than intervals of light sources 4331 to 4336 arranged at other positions. The light sources 4337 and 4338 arranged at the outside has a low overlapping degree of light emitted unlike the light sources 4331 to 4336 at the center portion, so the light sources 4337 and 4338 are relatively closely arranged. As shown in FIG. 28, an interval L1 at which the remaining light sources 4331 to 4336 are arranged is smaller than an interval L2 between the two light sources 4331 at the center portion, but is larger than an interval L3 between the light sources 4337 and 4338 arranged at the outside.

Through the arrangement of the light sources 433, the standard deviation of illuminance at each position inside the cultivation room 121, 122 may be reduced. In detail, the light sources 433 arranged as shown in FIG. 28 may obtain a result in which the standard deviation of illuminance is reduced by about 13% to 44%, compared to the case where the light sources 433 are arranged at equal intervals. The standard deviation of illuminance is a comparison of values measured at positions of the pods 10 in the cultivation room 121, 122, and when plants grow and increase in height, the gap between the plants and the lighting modules 401 and 402 is reduced, so that deviation may be increased. In the embodiment, the deviation is minimized through the arrangement of the light sources 433.

Meanwhile, in FIG. 29, the light sources 4331 to 43316 of the light array 431 are arranged at equal intervals. In this case, among the plurality of the light sources 4331 to 43316 provided in the light array 431, in order to obtain a result similar to the previous embodiment, light sources 4338 to 43310 arranged at the center portion of the light array 431 may be controlled to have lower illuminance than the light sources arranged on the both sides of the center portion or to have limited power supply. More specifically, the light sources 4338 to 43310 positioned at the center are controlled to have low illuminance, and the light sources 4331 to 4333 and 43314 to 43316 positioned at the outside are controlled to have relatively high illuminance.

FIG. 30 is a view schematically showing a state in which light is emitted from the light array 431 of the embodiment shown in FIG. 28. As shown in the drawing, in the light source part 430, the light sources are not arranged at equal intervals, but the center light sources are arranged at the relatively wider interval and the outside light sources are closely arranged. However, in a center portion of a lower side of the light array 431, light emitted from the plurality of the light sources 433 arranged at left and right sides of the light array 431 sufficiently overlap, so that illuminance over a predetermined size may be obtained therein. Therefore, among the seating grooves 351A to 351C of the bed cover 350, a seating grooves 351B positioned at the center has a similar amount of light to seating grooves 351A and 351C positioned relatively at the outside.

Meanwhile, in FIG. 19, the upper cover 460 is assembled on an upper portion of the lighting case 410, and the lighting cover 470 is assembled on a lower portion thereof. The upper cover 460 severs to cover the upper portion of the lighting case 410 and to prevent the inflow of foreign matter or moisture and may be formed in a flat plate structure. Through holes 465 are provided at the upper cover 460 for assembly to the lighting case 410, and the through hole 465 may be fastened to the installation boss 415 of the lighting case 410.

The upper cover 460 has a sensor through hole 436, and the above-described second residual detection sensor 440 may be exposed through the sensor through hole 436. The second residual detection sensor 440 is exposed upward through the sensor through hole 436, and may be positioned inside the sensing protrusion 323 in a lower portion of the second bed 300b arranged at an upper side of the lighting module. In the embodiment, the lighting cover 470 is formed of aluminum, but may be formed of various metal materials or synthetic resin materials.

An insulating cover 467 may be provided below the upper cover 460. The insulating cover 467 is provided between the upper cover 460 and the light source part 430, and enables insulation of the light source part 430 and the periphery. The insulating cover 467 is a non-conductor and may be formed in a thin film structure or a plate structure having a predetermined thickness.

The lighting cover 470 is assembled under the lighting case 410. The lighting cover 470 covers the underside of the light source part 430 so that moisture of the cultivation room 121, 122 does not enter the light source part 430. A surface of the lighting cover 470 is preferably coated or has surface processing for light diffusion. Therefore, light emitted from each light source 433 is not concentrated to one position, but is provided to be evenly distributed to all portions in the cultivation room 121, 122. The lighting cover 470 may be omitted and the light emitted from the light sources 433 may be directly transmitted to the cultivation room 121, 122.

As shown in FIG. 23, the lighting cover 470 is coupled to the light installation part 420. In the embodiment, the lighting cover 470 is assembled to each of a side opposite to the first light source installation part 420A and a side opposite to the second light source installation part 420B. One lighting cover 470 may be configured to cover all of the first light source part 430A provided in the first light source installation part 420A and the second light source part 430B provided in the second light source installation part 420B.

The lighting cover 470 is formed of a transparent material and the assembly end 472 protrudes along an edge of the lighting cover 470. The assembly end 472 is inserted into the cover assembly groove 422' depressed on the opposite side of the partition fence 422. The assembly protrusions 475 corresponding to the cover fastening holes 423 are provided at the assembly end 472 of the lighting cover 470. As described above, the protrusion structure may be provided inside the cover fastening holes 423, and the groove structure corresponding to the protrusion structure may be provided in the assembly end 472. When the lighting cover 470 is assembled to the lighting case 410, a lighting body 471 of the lighting cover 470 may not protrude downward more than the lighting case 410, and may be assembled to have a continuous surface with the lower surface of the lighting case 410.

Meanwhile, the cultivation room 121, 122 in the cabinet 100 may be divided into the lower first cultivation room 121 and the upper second cultivation room 122. In the above case, the bed 300a, 300b may include the first bed 300a provided in the first cultivation room 121 and the second bed 300b provided in the second cultivation room 122.

The first bed 300a is positioned in the bottom of the cabinet 100, and the first lighting module 401 is positioned in an upper side of the first bed 300a. Further, the second bed 300b is positioned on an upper surface of the first lighting module 401, and the second lighting module 402 is positioned on a ceiling in the cabinet 100, that is, at an upper side of the second bed 300b.

As described above, the first lighting module 401 may serve as a partition wall partitioning the two cultivation rooms 121 and 122 vertically. Accordingly, since a separate partition wall is not required, the maximum size of each of the cultivation rooms 121 and 122 may be secured.

Next, the circulation fan assembly 500 will be described with reference to FIGS. 1, 6, 7, and 31.

The circulation fan assembly 500 is configured to circulate air in the cultivation room 121, 122.

The circulation fan assembly 500 is provided in front of a rear wall surface constituting the inner case 120. The circulation fan assembly 500 is configured to suction air from a lower side in the cultivation room 121, 122 and then discharge air to an upper side in the cultivation room 121, 122. The upper and lower sides in the cultivation room 121, 122 may be determined on the basis of a middle height of the cultivation room 121, 122.

Meanwhile, the circulation fan assembly 500 may be provided for each of the cultivation rooms 121 and 122, or may be configured as the single circulation fan assembly 500 to control air circulation for all the cultivation rooms 121 and 122.

In the embodiment of the present disclosure, the circulation fan assembly 500 may be provided for each of the cultivation rooms 121 and 122. That is, the air circulations in the cultivation rooms 121 and 122 may be performed equally or separately by the circulation fan assemblies 500, respectively.

When the air circulation is separately controlled for each of the cultivation rooms 121 and 122, plants that require different types of cultivation environments may be simultaneously cultivated for each of the cultivation rooms 121 and 122.

The circulation fan assembly 500 includes a circulation fan 510, the shroud 520, and a partition wall 530.

The circulation fan 510 is driven for blowing air. The circulation fan 510 is configured as a radial flow fan suctioning air in a shaft direction thereof and blowing the air in a radial direction thereof.

Further, the shroud 520 is a part that guides a flow of air blown by the circulation fan 510 as the circulation fan 510 is provided.

The shroud 520 has an installation hole 521 formed by penetrating the shroud 520, the installation hole 521 being provided to receive the circulation fan 510. The shroud 520 has an air guide 522 at a front surface thereof, the air guide 522 guiding air suctioned through the circulation fan 510 from a rear portion (a gap between the shroud and the rear wall surface of the inner casing) in the cabinet 100 to flow into the cultivation room 121, 122. The air guide 522 is configured to guide air blown in the radial direction of the circulation fan 510 to flow to an upper side in the cultivation room 121, 122.

Further, the partition wall 530 is a part that is positioned at the front of the shroud 520 and blocks the shroud 520 from the cultivation room 121, 122.

That is, the partition wall 530 protects the circulation fan 510 from the inside of the cultivation room 121, 122.

A lower portion of the partition wall 530 is open to the inside of the cultivation room 121, 122. Thus, air flowing in the cultivation room 121, 122 flows through the open lower portion of the partition wall 530 to a portion where the rear wall surface is positioned in the inner casing 120 and then is heat-exchanged with an evaporator 630. Continuously, the air is supplied to the upper portion in the cultivation room 121, 122 by blowing force of the circulation fan 510 and flow guidance of the shroud 520, the above circulation of air is repeated.

In particular, opposite side surfaces of the partition wall 530 are fixed to the opposite wall surfaces or the rear wall surface in the inner casing 120. The shroud 520 is provided on the partition wall 530.

Next, the air conditioning module 600 will be described with reference to FIGS. 7 to 9.

The air conditioning module 600 is configured to control the temperature of air in the cultivation room 121, 122 of the inner casing 120.

The air conditioning module 600 may include an air conditioning system including the compressor 610, the condenser 620, and the evaporator 630. That is, the temperature control of the air being circulated in the cultivation room 121, 122 may be performed by the air conditioning system.

The compressor 610 and the condenser 620 is provided in the machine chamber 201 in the machine chamber frame 200.

The condenser 620 is positioned at an air inflow side of the opposite sides divided by the partition 230 in the machine chamber frame 200. The compressor 610 is positioned at a portion where the air passing through the condenser 620 passes. In particular, the compressor 610 is positioned at an air outflow side in the machine chamber frame 200.

The above structure is configured to allow the air flowing into the machine chamber 201 of the machine chamber frame 200 to pass through the condenser 620 by priority. That is, considering that the compressor 610 is the configuration generating a great quantity of heat, when the air conditioning module 600 is configured such that air passes through the compressor 610 and then heat-exchanges with the condenser 620, heat exchange efficiency may be reduced. Accordingly, it is preferable that the air conditioning module 600 is configured such that air passes through the condenser 620 before the compressor 610.

In addition, the condenser 620 is positioned at the front side (a side closer to the open front surface) in the machine chamber 201, and the compressor 610 is positioned at the rear side (a side closer to the rear surface plate) in the machine chamber 201.

The structure may be provided to maximally divide positions of the compressor 610 and the condenser 620 and to separate the compressor 610 from the condenser 620, so that the effect of the high temperature heat of the compressor 610 on the condenser 620 may be reduced.

A Cooling fan 611 is provided in an air inflow side of the compressor 610, so that air flows into and be discharged from the machine chamber 201 and dissipate heat of the compressor 610. The cooling fan 611 serves to block a portion where the compressor 610 is positioned from an air inflow side where the condenser 620 is positioned. Therefore, effect of high temperature heat of the compressor 610 on the condenser 620 may be reduced.

Further, the evaporator 630 is arranged at a portion at the rear of the circulation fan assembly 500, in each portion in the inner casing 120. That is, by the operation of the circulation fan assembly 500, in the circulation operation in which air is discharged upward in the cultivation room 121, 122, the evaporator 630 suctions air from a lower side in the cultivation room and the air is heat-exchanged while passing through the evaporator 630.

The evaporator 630 is a plate shaped evaporator so as to be stably installed in front of a rear wall surface of inner wall surfaces of the inner casing 120 and improve heat exchange performance even when the apparatus is located in a narrow place.

Meanwhile, the air conditioning module 600 may have an electric heater. That is, when a plant that lives in a higher temperature environment than the normal indoor environment is cultivated, the electric heater may be used to cultivate the plant.

Next, the water supply module 700 will be described with reference to FIGS. 32 to 35.

The water supply module 700 is configured to supply the supply water to the bed 300.

In the embodiment of the present disclosure, the water supply module 700 is configured to pump a required amount of water to the bed 300 when the water supply is needed in a state of storing the supply water in advance.

That is, the conventional cultivation apparatus does not use the method of supplying a required amount of the supply water, but use a method of storing enough supply water in a water storage and supplying the stored supply water to soil by using an absorbing member. Herein, the supply water is mixed with a nutrient solution, so that a problem with contamination of the supply water may occur.

However, in the embodiment of the present disclosure, as a nutrient solution material is contained in the bed soil 11 of the pod 10 and the pod 10 receives a required amount of supply water, residual water is prevented from existing in portions other than a water tank 710, so that odor due to contamination of the supply water may be fundamentally prevented.

The water supply module 700 includes the water tank 710, a water pump 720, and an inlet hose 731, 732.

The water tank 710 is a part in which the supply water is stored.

The water tank 710 is formed in a rectangular box structure that is open at an upper portion thereof, and be positioned between a bottom 123 of the inner casing 120 and the first bed 300*a*. That is, considering that a gap is e provided between the bottom 123 of the inner casing 120 and the first bed 300*a* because the upper surface plate 214 of the machine chamber frame 200 partially protrudes upward due to the height of the compressor 610 in the machine chamber 201, the water tank 710 is positioned in the gap, so that the cultivation room 121, 122 may be formed to be large enough.

In particular, the water tank 710 is positioned at a front side in the cabinet 100 and be provided to be drawable forward from the cabinet 100. That is, considering that the rear portion of the machine chamber 201 is formed to be higher than the other portion due to the height of the compressor 610, the water tank 710 is provided in a front portion of a lower portion in the inner casing 120 which is provided due to the upward protruding portion of the machine chamber 201. On the opposite side wall surfaces of the cabinet 100, second guide rails 102 are provided to guide back and forth movement of the water tank 710.

In addition, the water tank 710 is configured to be exposed to the indoor when the door 130 is opened. That is, the door 130 is configured to block not only the cultivation room 121, 122 but also the water tank 710, so that the water tank 710 is exposed outward when the door 130 is opened. Thereby, the user can easily eject the water tank 710 and replenish the supply water.

The water tank 710 has a handle 711 at a front surface thereof, and the user can eject and retract the water tank 710 by using the handle 711 in the drawer manner.

In particular, the handle 711 of the water tank 710 is also configured not to contact the door 130 like the handle 361 of the bed 300. Thus, a gap is provided between a front surface of the handle 711 and the door 130.

Next, the water pump 720 is a part pumping the supply water in the water tank 710.

The water pump 720 is positioned at the rear of the water tank 710.

In particular, an installation frame 740 may be provided between the water tank 710 and the water pump 720, and the water pump 720 may be fixed on a rear surface of the installation frame 740. That is, when the water tank 710 is ejected, the installation frame 740 may prevent the water pump 720 from being exposed outward and allow the water pump 720 to be fixed in its original position.

Further, a sensing part 741 detecting whether or not the water tank 710 is ejected may be provided on a front surface of the installation frame 740. The sensing part 741 is configured of a proximity sensor, and when the water tank 710 is closer to the sensing part 741, the sensing part 741 determines that the water tank 710 is retracted in the plant cultivation apparatus. The sensing part 741 may be configured of various detecting devices, such as a touch switch.

In addition, a first residual water detection sensor 742 is provided at an upper surface of the installation frame 740. The first residual water detection sensor 742 detects residual water remaining in the water supply groove 320 of the first bed 300a positioned above the installation frame 740.

In particular, the first residual water detection sensor 742 is positioned inside the sensing protrusion 323 in a lower portion of the first bed 300a and senses whether or not the residual water remains on the upper surface of the sensing protrusion 323 to determine the residual water in the water supply groove 320.

The first residual water detection sensor 742 is configured of a capacitance-type sensor and accurately detects the residual water in the water supply groove 320.

The first residual water detection sensor 742 is configured of other methods not shown in the drawings. For example, the first residual water detection sensor 742 is configured as a mechanical sensor such as a floating method or an electronic sensor using two electrodes.

In addition, a third residual water detection sensor 743 may be additionally provided on the front surface of the installation frame 740. The third residual water detection sensor 743 provided on the front surface of the installation frame 740 serves to check whether or not the supply water remains in the water tank 710.

Next, the inlet hose 731, 732 is a part supplying the supply water pumped by the water pump 720 to the bed 300a, 300b.

The inlet hose 731, 732 is provided such that a first end thereof is connected to the water pump 720 and a second end thereof is positioned directly above the water reservoir 310 of the bed 300a, 300b.

The inlet hose 731, 732 includes a first inlet hose 731 supplying the supply water into the water reservoir 310 of the first bed 300a and a second inlet hose 732 supplying the supply water into the water reservoir 310 of the second bed 300b.

Meanwhile, the open upper surface of the water tank 710 constituting the water supply module 700 is configured to be opened and closed by an opening and closing cover 750.

In addition, the opening and closing cover 750 is provided with a water supply connection tube 760 that is connected to the water pump 720 to supply the supply water stored in the water tank 710 to the water pump 720. That is, the water pump 720 is not configured to be directly coupled to the water tank 710, but is configured to be selectively connected thereto by the water supply connection tube 760. Whereby, only the water tank 710 is ejected from the cabinet 100.

The water supply connection tube 760 includes an inlet tube 761 and a connection tube 762, the inlet tube 761 protruding from a lower surface of a rear side of the opening and closing cover 750 into the water tank 710, and the connection tube 762 being extended toward a rear surface of an upper end of the inlet tube 761 and connected to the water pump 720. That is, when the water tank 710 is retracted in the plant cultivation apparatus, while the connection tube 762 is connected to the water pump 720, the supply water in the water tank 710 is pumped into the inlet hose 731, 732 by the pumping operation of the water pump 720. Further, when the water tank 710 is ejected from the plant cultivation apparatus, the connection tube 762 is separated from the water pump 720.

In particular, it is preferably that the inlet tube 761 protrudes to the bottom in the water tank 710, so that the supplementing cycle of the supply water in the water tank 710 may be delayed as much as possible.

In addition, the water pump 720 and the two inlet hoses 731 and 732 are connected to each other by a flow path valve 770. That is, through the operation control of the flow path valve 770, the supply water pumped by the water pump 720 may be supplied into at least one of the inlet hoses 731 and 732.

Meanwhile, non-described reference numeral 745 is a water level detection sensor detecting water level of the supply water in the water tank 710.

Meanwhile, the plant cultivation apparatus according to the embodiment of the present disclosure includes the display module 800.

The display module 800 is configured to display each condition of the plant cultivation apparatus and to perform various controls.

Each condition displayed through the display module 800 may be the temperature in the cultivation room 121, 122, cultivation time, operational states.

Further, the display module 800 may be configured to be operated in a touchable manner, or may be configured to be operated by a button or a switch.

In particular, the display module 800 may be provided in the cabinet 100 or in the door 130.

However, when the display module 800 is provided in the door 130, the connection structure of various signal lines or power lines may be inevitably complicated.

Considering the above problem, the display module 800 is preferably provided in the cabinet 100.

Moreover, considering that the sight glass 132 constituting the inside portion of the door 130 may be formed of a transparent material such as glass, the display module 800 is preferably provided in the front of the first lighting module 401 among the lighting modules 401 and 402.

Hereinbelow, the operation of the plant cultivation apparatus according to the embodiment of the present disclosure will be described in detail for each process.

First, a provision process of the pod 10 will be described.

When the pod 10 is newly provided in the plant cultivation apparatus, the user can open the door 130, and eject the entire bed 300a, 300b positioned in the cultivation room 121, 122 while the cultivation room 121, 122 of the inner casing 120 is opened.

The bed 300a, 300b is slidingly moved along the first guide rails 101 and ejected from the cultivation room 121, 122 in the inner casing 120. The bed 300a, 300b is not ejected completely, but is ejected only to the point where the pod 10 is easily seated without discomfort.

In this state, the protection film 15 of the prepared pod 10 is removed and then the pod 10 is seated on the seating groove 351, 352 of the bed cover 350.

The pod 10 is arranged such that the protrusion 16 provided in the lower surface thereof is positioned to match with the penetration hole 351a, 352a formed in the seating groove 351, 352. Thus, the pod 10 is seated on the bed cover 350 in the state of being partially received in the seating groove 351, 352.

When a pod 10 where plant cultivation is completed is in the seating groove 351, 352 of the bed cover 350, the pod 10 with completed cultivation is removed from the bed cover 350 and then a new pod 10 is seated on the seating groove 351, 352.

Then, when the seating of the pod 10 is completed, the bed 300a, 300b is pushed and retracted into the cultivation room 121, 122.

The above operation is performed about at least one or all of the first bed 300a of the first cultivation room 121 and the second bed 300b of the second cultivation room 122 sequentially or selectively.

Next, the cultivation process will be described.

As described above, when the pod 10 is provided in the bed 300a, 300b in the cultivation room 121, 122, for germination of seeds planted in the pod 10 or for cultivation of germinated seeds in the pod 10, maintenance of temperature, provision of light, and supply of the supply water suitable for the germination and cultivation should be performed.

The control may be performed with a program set by default in the controller 20, and may be individually designated by the user.

In the embodiment of the present disclosure, the control is automatically performed based on the program set by default. The program may vary in response to the type of plant or cultivation method.

The above-described control is performed by manipulating the display module 800.

That is, when the cultivation operation is performed by manipulating the display module 800 in the state in which the bed 300a, 300b provided with the pod 10 is provided in the cultivation room 121, 122, the controller 20 controls the air conditioning module 600, the circulation fan assembly 500, the lighting module 401, 402, and the water supply module 700 to automatically cultivate the plant.

When the operation of the air conditioning module 600 is controlled, the cooling fan 611 and the air conditioning module including the compressor 610, the condenser 620, and the evaporator 630 is operated to perform air conditioning operation.

In particular, when the air conditioning operation is performed, indoor air is suctioned into the machine chamber 201 through the inlet 221 of the intake and exhaust grill 220 provided on the open front surface of the machine chamber, and the air passing through the machine chamber is discharged through the outlet 222 of the intake and exhaust grill 220. The indoor air suctioned into the inlet 221 performs heat exchange while passing through the condenser 620, and the cooling fan 611 dissipate the compressor 610 heat while passing through the compressor 610 and then be discharged indoors through. The above operation is as shown in FIG. 36.

In addition, when the air conditioning operation is performed, the circulation fan 510 constituting the circulation fan assembly 500 is operated.

Accordingly, air flowing into the rear side in the inner casing 120 passes through the circulation fan 510 and be supplied into the cultivation room 121, 122. In addition, the air flows in the cultivation room 121, 122 and then flow to a portion where the rear wall surface is provided in the inner casing 120 through the open lower end of the partition wall 530 positioned in rear of the cultivation room 121, 122. Continuously, the air is heat-exchanged by passing through the evaporator 630 positioned at the position and then be supplied into the cultivation room 121, 122 by the blowing of the circulation fan 510. As the above circulation is repeated, the temperature in the cultivation room 121, 122 is controlled. The above operation is as shown in FIG. 38.

In particular, during the repeated air circulation in the cultivation room 121, 122 by the operation of the circulation fan 510, air flows to the rear side of the cultivation room 121, 122, is heat-exchanged while passing through the evaporator 630, and then is supplied to the upper side in the cultivation room 121, 122 through the circulation fan assembly 500.

Accordingly, the air introduced into the cultivation room 121, 122 flows through the inside of the cultivation room 121, 122 to keep the inside at a predetermined temperature, so that the cultivated plants may be cultivated in optimal temperature conditions.

Meanwhile, a part of the air circulated in the second cultivation room 122 passes through a gap between a front surface of the second bed 300b and the door 130 and flow into the first cultivation room 121, and a part of air circulated in the first cultivation room 121 passes through a gap between a front surface of the first bed 300a and the door 130. Accordingly, condensation is prevented on the surface of the door 130 by the flow of air passing through the gap.

Further, when the cultivation operation is performed, the operation of the lighting module 401, 402 is also controlled.

By controlling the operation of the lighting module 401, 402, the light source part 430 is periodically lit (or continuously lit) and provides light to the plants in the cultivation room 121, 122.

Herein, the standard deviation of illuminance at each position in the cultivation room 121, 122 may be reduced through the above-described arrangement of the light sources 433. That is, compared to the case where the light sources 433 are arranged at equal intervals, the standard deviation of illuminance is reduced by about 13% to 44%, and as a result, the plants may grow evenly.

As shown in FIG. 26, among the plurality of the light sources 433 provided in the one light array 431, the light sources 433 arranged at the center portion of the light array 431 are arranged at relatively wider interval than intervals between the light sources 433 arranged opposite to the center portion. The light array 431 includes the plurality of the light sources 433 and light emitted from the light sources 433 adjacent to each other overlaps. Since light overlaps in the center portion of the light array because many light sources 433 provided therein, the light sources 433 are arranged at relatively wider interval. Accordingly, the light array 431 may emit light evenly.

Looking at the direction in which the light is emitted, due to the inclination of the light source guide 425, the emitted artificial light is not distributed to the periphery, for example, the side surface or the upper surface of the cultivation room 121, 122, and is concentrated to the bed 300a, 300b. Further, as shown in FIG. 24, due to the inclination of the light source guide 425, the light source 433 is positioned to be biased toward the upper cover 460, so that the light is prevented from leaking toward the side surface of the cultivation room 121, 122.

In addition, when the light source part 430 of the lighting module 401, 402 is operated, artificial light is emitted from the light sources 433 and is provided to the plants. The light source part 430 may be controlled by the controller 20 according to various environment conditions such as plant growth rate, time, temperature, and illuminance in the cultivation room 121, 122.

For example, the activation time of the light source part 430 may be controlled on the basis of a previously stored plant growth reference data and an illuminance value detected by an illuminance sensor (not shown). That is, the controller 20 may calculate the time when an illuminance value input from the illuminance sensor exceeds a reference value, and may control the activation time of the light source part 430 to suit a light demand of the plants. For accurate illuminance measurement, the illuminance sensor is preferably provided in the bed 300a, 300b, that is, a lower side of the lighting module 401 and 402.

Meanwhile, as described above, since the lighting module 401, 402 is operated when the above-described cultivation operation is performed, temperature control in the cultivation room 121, 122 may be performed together by the freezing system. In the process, air flowing in the cultivation room 121, 122 flows into the rear side space of the cabinet 100 and heat-exchanged with the evaporator 630 positioned at the rear side space, and as a result, water may be generated.

The generated water falls down, and falls on the upper portion of the lighting module 401, 402. In the embodiment, the drainage guide 412 is provided in the lighting module 401, 402. The drainage guide 412 is positioned at a position corresponding to a lower side of the evaporator 630. Therefore, when water generated from the evaporator 630 and falls on the drainage guide 412, and may be positioned downward through the drain hole 412'. Even when water generated from the evaporator 630 and moisture in the cultivation room 121, 122 and falls on the lighting module 401, 402, the water may be discharged without remaining in the lighting module 401, 402.

Meanwhile, even when the lighting module 401, 402 controls the light source part 430 to emit light, as a protection film (or sight glass of dark color, not shown) of the sight glass 132 constituting the door 130 is provided, the inconvenience of the indoor user may be minimized by minimizing leakage of the light in the cultivation room 121, 122 indoors by the protecting film (not shown) of the sight glass 132 (or sight glass of dark color) constituting the door 130.

In addition, when the cultivation operation is performed, the operation control of the water supply module 700 is performed periodically (or when necessary).

That is, when the cultivated plant and the water supply cycle of the plant are determined, the operation control of the water pump 720 is performed for each water supply cycle. When the operation of the water pump 720 is controlled and the sensing part 741 detects that the water tank 710 is not in place, the water pump 720 is controlled not to be operated.

Whereas, when the sensing part 741 detects that the water tank 710 exists, the water pump 720 is operated to supply the supply water stored in the water tank 710 to each bed 300a, 300b.

Then, the supply water is pumped to the water pump 720 through the water supply connection tube 760, and be supplied through the flow passage valve 770 to the water reservoir 310a of the bed 300a, 300b through the inlet hose 731, 732.

The supply water supplied to the water reservoir 310 is supplied to the water supply groove 320 in the bed 300a, 300b by guidance of the water supply flow path 330 connected to the water reservoir 310. Herein, since the bank parts 331 are formed by protruding at the opposite sides of the water supply flow path 330, the supply water may flow smoothly into the water supply groove 320 along the water supply flow path 330.

In particular, considering that the flow guidance groove 302 is provided in the communication portion between the water supply flow path 330 and the water supply groove 320 and the water supply groove 320 is formed in a track shaped structure, the supply water flowing into any one portion in the water supply groove 320 by guidance of the water supply flow path 330 flows from the one portion of the water supply groove 320 to another portion thereof by guidance of the flow guidance groove 302 to be filled in the front water supply groove 321 and the rear water supply groove 322 in order. The above description is as shown in FIG. 31.

Further, the supply water filled in the water supply groove 320 is absorbed in the bed soil 11 of the pod 10 through the protrusion 16 of the pod 10 and then is supplied to the plant, the protrusion 16 of the pod 10 being provided to be in contact with the supply water in the water supply groove 320.

Meanwhile, during the above-described water supply process, the residual water detection sensor 440, 742 detects the water level of the supply water in the water supply groove 320.

That is, the residual water detection sensor 440, 742 checks whether or not the supply water remains on the surface of the sensing protrusion 323 of the water supply groove 320, and when the residual water detection sensor 440, 742 determines the remaining of the supply water, the operation of the water pump 720 is stopped so that the supply water is not supplied.

The water supply method of using the residual water detection sensor 440, 742 is intended to prevent the residual water in the bed 300a, 300b. That is, since the pod is received as much water as needed, occurrence of residual water due to excessive water supply and contamination of the produced residual water may be prevented.

In particular, considering that increasing amount of the supply water is needed as the plant grows, the method according to the embodiment of the present disclosure may be configured such that, when the plant absorbs more water, more water may be supplied to the bed, thus water may always be properly supplied even when enough moisture changes as the plant grow.

The invention claimed is:

1. A plant cultivation apparatus comprising:
   a cabinet defining a cultivation space;
   a door for opening and closing the cultivation space;
   a liquid supply module positioned in the cabinet, and comprising a liquid tank in which a liquid is stored, a liquid pump positioned in the liquid tank and pumping the liquid stored in the liquid tank, and an inlet hose guiding the liquid pumped by the liquid pump;
   a bed positioned above the liquid supply module, and receiving the liquid from the liquid supply module;
   one or more pods seated on an upper surface of the bed; and
   a lighting module provided above the bed in the cabinet and providing lighting for plant cultivation,
   wherein the lighting module comprises:
     a light source part comprising a plurality of light sources;
     a lighting casing in which the light source part is provided;
     a lighting cover coupled to the lighting casing and covering the light source part; and
     an upper cover that is provided on an upper portion of the lighting casing and covers the light source part from an opposite side to the lighting cover and
   wherein the lighting module forms an apparatus independent from the cabinet, so that the lighting module is separable from the cabinet.

2. The plant cultivation apparatus of claim 1, wherein the plurality of light sources include first light sources emitting light toward a center of the bed and second light sources arranged adjacent thereto, and intervals between the first light sources are relatively wider that intervals between the second light sources.

3. The plant cultivation apparatus of claim 1, wherein the light source part comprises a plurality of light arrays, each of the light arrays including a subset of the plurality of light sources that are arranged in one direction, and the plurality of light arrays being arranged in the lighting casing while being spaced apart from each other.

4. The plant cultivation apparatus of claim 1,
wherein the light source part comprises a light array that includes a subset of the plurality of light sources that are arranged in one direction,
wherein the subset of the plurality of light sources included in the light array includes a first group and a second group of the plurality of light sources the first group of light sources being arranged in a center portion of the light array and being arranged at wider intervals than the second group of light sources that are arranged in opposite sides of the center portion of the light array, and
wherein the first group of light sources arranged in the center portion are spaced apart from each other to provide a light source separation part, and a center one of the pods provided below the lighting module is positioned below the light source separation part.

5. The plant cultivation apparatus of claim 1,
wherein the light source part comprises a light array including a subset of the plurality of light sources that are arranged in one direction, and the subset of the plurality of light sources in the light array include first light sources arranged in edges of the light array and second light sources that are arranged other positions, intervals between the first light sources being relatively narrower than intervals between the second light sources.

6. The plant cultivation apparatus of claim 1,
wherein the light source part comprises a light array including a subset of the plurality of light sources that are arranged in one direction, and the subset of the plurality of light sources in the light array include first light sources and second light sources, the first light sources being arranged in a center portion of the light array and being controlled to have low illuminance or to be limited in power supply in comparison to second light sources that are arranged opposite sides of the center portion of the light array.

7. The plant cultivation apparatus of claim 1,
wherein the plurality of light sources included in the light source part constitute a plurality of light source groups, and two of the light source groups are spaced apart from each other to provide a non-lighting section in a gap between the two light source groups, and
wherein the pods include pod groups that are arranged below the lighting module, and the non-lighting section is positioned at a position corresponding to a space between two of the pod groups.

8. The plant cultivation apparatus of claim 1,
wherein the pods are provided below the lighting module, and an outermost one of the pods is configured to protrude relatively farther outward than the light source part.

9. The plant cultivation apparatus of claim 1, wherein:
a light source installation part is provided in the lighting casing of the lighting module,
the light source part is provided in the light source installation part,
the upper cover covers one side of the light source installation part,
the light source installation part has light source holes that are open so as to allow the plurality of light sources constituting the light source part to be exposed toward the bed, and
a light source guide is provided at an edge of each of the light source holes in an inclined direction.

10. The plant cultivation apparatus of claim 9,
wherein the light source guide is extended at a wider angle than a light emitting angle of each of the light sources.

11. The plant cultivation apparatus of claim 9,
wherein the light source guide is extended to be symmetric to opposite sides with respect to one of the light source holes positioned in a center, and is extended to be inclined in a direction away from the lighting cover as the light source guide extends toward the one of the light source holes.

12. The plant cultivation apparatus of claim 9,
wherein an insulating cover is provided between the light source part of the lighting module and the upper cover.

13. The plant cultivation apparatus of claim 1,
wherein, in the lighting casing of the lighting module, a light array constituting the light source part and a light source installation part covered by the upper cover are provided, and a partition fence protrudes while surrounding the light source installation part in the lighting casing, and an upper surface of the partition fence is in close contact with the upper cover.

14. The plant cultivation apparatus of claim 1,
wherein a wire guide part is provided along an edge of the lighting casing of the lighting module, and the wire guide part has a hook for fixing a wire harness seated on the wire guide part, and
wherein the lighting casing has a wire through hole through which the wire harness passes, and the wire through hole is provided in the wire guide part or at a position that is adjacent to the wire guide part.

15. The plant cultivation apparatus of claim 1,
wherein, in the lighting casing constituting the lighting module, a drainage guide is provided in a downward inclined direction along an edge positioned inside the cultivation space, and a drain hole is open at one side of the drainage guide, and
wherein the drainage guide is provided at one end of the lighting casing to be exposed outward, and the lighting module is installed in the cabinet such that the drainage guide is positioned below an evaporator.

16. The plant cultivation apparatus of claim 1,
wherein, in the lighting module, the lighting cover formed of a transparent material is coupled to an outer surface thereof facing the bed and covers the light sources exposed toward the bed, and
wherein a light source installation part on which the light source part is installed is provided in the lighting casing of the lighting module, and the lighting cover is coupled to an outer surface of the lighting casing at a position opposite to the light source installation part such that the lighting cover faces the pods.

17. The plant cultivation apparatus of claim 1, further comprising at least one of:
a temperature sensor that is provided in a center of the lighting casing constituting the lighting module, the temperature sensor being exposed toward the bed, or
a residual liquid detection sensor included in the lighting casing of the lighting module, that protrudes toward the bed, and is stacked on an upper portion of the lighting module.

18. The plant cultivation apparatus of claim 1,
wherein the light source part comprises a circuit board in which the plurality of light sources is provided, and in the circuit board, the plurality of light sources are arranged in one direction to provide a light array.

19. The plant cultivation apparatus of claim 1,
wherein the plurality of light sources included in the light source part constitutes one light array, a plurality of the light arrays constitutes one light source group, the plurality of light sources are mounted to one circuit board, and the circuit board is spaced apart from another, adjacent circuit board so that the light source group is spaced apart from an adjacent light source group provided on the adjacent circuit board.

20. A plant cultivation apparatus comprising:
a cabinet defining a cultivation space;
a door for opening and closing the cultivation space;
a liquid supply module positioned at the cabinet, and comprising:
    a liquid tank in which a liquid is stored,
    a liquid pump positioned in the liquid tank to pump the liquid stored in the liquid tank, and
    an inlet hose guiding the liquid pumped by the liquid pump;
a bed positioned above the liquid supply module, and receiving the liquid from the liquid supply module, an upper surface of the bed receiving one or more pods; and
a lighting module removably provided above the bed in the cabinet and providing lighting for plant cultivation,
wherein the lighting module comprises:
    a plurality of light sources including a first pair of light sources positioned at a center of the plurality of light sources and second pair of light source positioned away from the center, an interval between the first pair of light sources being relatively wider than an interval between the second pair of light sources; and
    a lighting casing in which the plurality of light sources are provided.

* * * * *